US012358154B2

(12) United States Patent
Park et al.

(10) Patent No.: US 12,358,154 B2
(45) Date of Patent: Jul. 15, 2025

(54) ROBOT FOR EXPRESSING EMOTIONAL STATE OF PET AND CONTROL METHOD THEREOF

(71) Applicant: SAMSUNG ELECTRONICS CO., LTD., Suwon-si (KR)

(72) Inventors: Jisun Park, Suwon-si (KR); Sunkyoung Kim, Suwon-si (KR); Yohan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 18/110,216

(22) Filed: Feb. 15, 2023

(65) Prior Publication Data

US 2023/0191618 A1 Jun. 22, 2023

Related U.S. Application Data

(63) Continuation of application No. PCT/KR2021/009246, filed on Jul. 19, 2021.

(30) Foreign Application Priority Data

Sep. 10, 2020 (KR) .................. 10-2020-0116001

(51) Int. Cl.
*B25J 11/00* (2006.01)
*B25J 9/16* (2006.01)

(52) U.S. Cl.
CPC .......... *B25J 11/001* (2013.01); *B25J 9/1697* (2013.01)

(58) Field of Classification Search
CPC .... B25J 11/001; B25J 11/0005; B25J 9/0003; A01K 29/00; A01K 29/005; G06F 3/0488;

(Continued)

(56) References Cited

U.S. PATENT DOCUMENTS 5,790,033 A * 8/1998 Yamamoto ........... A01K 15/021
704/E15.041
10,231,442 B1 * 3/2019 Chang .................... A01K 5/02
(Continued)

FOREIGN PATENT DOCUMENTS

CN 104932459 A 9/2015
CN 107020637 A * 8/2017 .......... B25J 11/0005
(Continued)

OTHER PUBLICATIONS

International Search Report (PCT/ISA/210) issued by the International Searching Authority on Oct. 26, 2021 in International Application No. PCT/KR2021/009246.
(Continued)

*Primary Examiner* — Ramon A. Mercado
*Assistant Examiner* — Tyler Roger Robarge
(74) *Attorney, Agent, or Firm* — Sughrue Mion, PLLC

(57) ABSTRACT

A robot includes: a camera; a driver configured to control a motion of the robot; a memory configured to store information on a plurality of motions of the robot and a plurality of emotional states of a pet corresponding to the plurality of motions of the robot; and a processor connected to the driver, the camera, and the memory, wherein the processor is configured to: obtain at least one image of the pet through the camera, identify, based on the obtained at least one image the pet and the information stored in the memory, an emotional state of the pet from among the plurality of emotional states of the pet, identify, based on the information stored in the memory, a motion of the robot corresponding to the identified emotional state, from among the plurality of motions, and control the driver to cause the robot to perform the identified motion of the robot.

18 Claims, 26 Drawing Sheets

(58) Field of Classification Search
CPC . G06Q 50/22; G08B 7/06; H04N 7/18; G06V 20/52

See application file for complete search history.

(56) References Cited

U.S. PATENT DOCUMENTS

| | | | | |
|---|---|---|---|---|
| 11,406,301 | B2* | 8/2022 | Kim | A61B 5/0024 |
| 2020/0267936 | A1* | 8/2020 | Tran | A01K 29/005 |
| 2021/0039251 | A1* | 2/2021 | Moon | G06V 20/10 |
| 2022/0165294 | A1* | 5/2022 | Jang | H04L 67/12 |

FOREIGN PATENT DOCUMENTS

| | | | | |
|---|---|---|---|---|
| CN | 107116563 | A | | 9/2017 |
| CN | 109255310 | A * | | 1/2019 |
| CN | 109451356 | A * | 3/2019 | A01K 15/02 |
| CN | 111814665 | A * | | 10/2020 |
| CN | 110647046 | B * | 8/2022 | G05B 15/02 |
| JP | 10-3479 | A | | 1/1998 |
| JP | 2020170916 | A * | 10/2020 | A01K 29/005 |
| KR | 10-2011-0095083 | A | | 8/2011 |
| KR | 10-2015-0114310 | A | | 10/2015 |
| KR | 10-2017-0107341 | A | | 9/2017 |
| KR | 10-2017-0135195 | A | | 12/2017 |
| KR | 20170135195 | A * | 12/2017 | B25J 11/0005 |
| KR | 10-2018-0052858 | A | | 5/2018 |
| KR | 20180052858 | A * | 5/2018 | A63H 3/36 |
| KR | 10-2019-0052443 | A | | 5/2019 |
| KR | 10-2022893 | B1 | | 11/2019 |
| KR | 102022883 | B1 * | 11/2019 | A61B 5/01 |
| KR | 102172648 | B1 * | 11/2020 | G06F 3/005 |
| KR | 20210079477 | A * | 6/2021 | A61B 5/0205 |
| WO | WO-2018035820 | A1 * | 3/2018 | G06F 16/00 |

OTHER PUBLICATIONS

Written Opinion (PCT/ISA/237) issued by the International Searching Authority on Oct. 26, 2021 in International Application No. PCT/KR2021/009246.

* cited by examiner

ROBOT FOR EXPRESSING EMOTIONAL STATE OF PET AND CONTROL METHOD THEREOF

CROSS-REFERENCE TO RELATED APPLICATIONS

This application is a continuation of International Application No. PCT/KR2021/009246, filed on Jul. 19, 2021, which is based on and claims priority to Korean Patent Application No. 10-2020-0116001, filed on Sep. 10, 2020 in the Korean Intellectual Property Office, the disclosures of which are incorporated herein by reference in their entireties.

BACKGROUND

1. Field

The disclosure relates to a robot for expressing an emotional state of a pet, and more particularly, to a movable robot that monitors a pet, analyzes an emotional state of the pet, and expresses the analyzed emotional state based on a motion.

2. Description of Related Art

Mobile robots for pets have been developed. However, in most cases, when robots operate, the dependence on manual operations of users received through mobile devices of the users is very high, and thus user inconvenience has not been solved in many cases.

In addition, simple transmission of a condition of a pet monitored by the robot as text through the user's mobile device does not greatly contribute to emotional communication between the user and the pet.

SUMMARY

Provided is a robot capable of actively tracking and monitoring a pet and analyzing an emotional state of the pet in real time.

In addition, provided is a robot that may contribute to emotional communication between a user and a pet by expressing an emotional state of a pet based on non-verbal factors, such as a robot motion.

According to an aspect of the disclosure, a robot includes: a camera; a driver configured to control a motion of the robot; a memory configured to store information on a plurality of motions of the robot and a plurality of emotional states of a pet corresponding to the plurality of motions of the robot; and a processor connected to the driver, the camera, and the memory, wherein the processor is configured to: obtain at least one image of the pet through the camera, identify, based on the obtained at least one image the pet and the information stored in the memory, an emotional state of the pet from among the plurality of emotional states of the pet, identify, based on the information stored in the memory, a motion of the robot corresponding to the identified emotional state, from among the plurality of motions, and control the driver to cause the robot to perform the identified motion of the robot.

The robot may further include a body and a plurality of wheels attached to the body, and the processor may be further configured to control a movement of at least one of the body and at least one wheel of the plurality of wheels through the driver to cause the robot to perform the identified motion.

The robot may further include a microphone, and the processor may be further configured to: based on a verbal user inquiry regarding a state of the pet being received through the microphone, identify an emotional state of the pet based on at least one image of the pet captured through the camera within a predetermined time range based on a time point at which the verbal user inquiry is received, and control the driver to cause the robot to perform the motion corresponding to the identified emotional state.

The robot may further include a touch sensor, and the processor may be further configured to: based on a predetermined user gesture being received through the touch sensor, identify an emotional state of the pet based on at least one image of the pet captured through the camera within a predetermined time range based on a time point at which the predetermined user gesture is received, and control the driver to cause the robot to perform the motion corresponding to the identified emotional state.

The robot may further include a communicator, and the processor may be further configured to: receive first user location information through the communicator, based on the first user location information, identify a first point in time corresponding to a user departing from a location where the pet is located, receive second user location information through the communicator, based on the second user location information, identify a second point in time corresponding to the user returning to the location where the pet is located, wherein a period of time including the first point in time through the second point in time comprises a departure period, obtain at least one image of the pet through the camera during the departure period, based on the at least one image of the pet obtained during the departure period, identify a departure period emotional state of the pet from among the plurality of emotional states of the pet, and control the driver to cause the robot to perform a motion of the robot from among the plurality of motions of the robot corresponding to the departure period emotional state.

The robot may further include a speaker; and a light emitter, and the processor may be further configured to control the speaker to output a sound corresponding to the identified emotional state and to control the light emitter to output light of a color corresponding to the identified emotional state.

The processor may be further configured to: obtain a plurality of sequential images of the pet through the camera during a time period, for each respective sequential image of the plurality of sequential images, identify an emotional state of the pet from among the plurality of emotional states of the pet corresponding to the respective sequential image of the plurality of sequential images, based on the identified respective emotional states of the pet corresponding to each respective sequential image of the plurality of sequential images, determine whether the pet had a change of emotional state during the time period, based on determining that the pet had a change of emotional state during the time period, identify at least one image from among the plurality of sequential images corresponding to the change of emotional state of the pet and identify an emotional state of the pet from among the plurality of emotional states of the pet corresponding to the identified at least one image from among the plurality of sequential images, and generate a video based on the identified at least one image from among the plurality of sequential images.

The robot may further include a communicator, and the processor may be further configured to transmit the video to a display device through the communicator, and to control the driver to cause the robot to perform a motion of the robot from among the plurality of motions of the robot corresponding to the identified emotional state of the pet from among the plurality of emotional states of the pet corresponding to the identified at least one image from among the plurality of sequential images.

The robot may further include a communicator, and the processor may be further configured to: transmit the obtained at least one image to a server through the communicator, and based on the obtained image, receive information on an emotional state of the pet through the communicator from the server.

The processor may be further configured to: identify a motion of the pet based on the at least one obtained image, and based on the identified motion of the pet corresponding to a predetermined motion, transmit the at least one obtained image to the server.

According to an aspect of the disclosure, a method for controlling a robot includes: obtaining at least one image of a pet through a camera of the robot; identifying an emotional state of the pet based on the obtained at least one image; identifying a motion corresponding to the identified emotional state, from among a plurality of pre-stored motions; and driving the robot to perform the identified motion from among the plurality of pre-stored motions.

The robot may include a body and a plurality of wheels attached to the body, and the driving the robot may include controlling a movement of at least one of the body and at least one wheel of the plurality of wheels to perform the identified motion.

The method may further include: receiving a user input regarding a state of the pet; and obtaining through the camera at least one image of the pet within a predetermined time before or after receiving the audio input, wherein the identifying the emotional state of the pet further comprises identifying the emotional state of the pet based on the at least one image of the pet obtained within the predetermined time before or after receiving the user input.

The robot may further include a microphone, and the user input may include an audio input received through the microphone.

The robot may further include a touch sensor, and the user input may include a predetermined user gesture received through the touch sensor.

The method may further include: receiving first user location information; based on the first user location information, identifying a first point in time corresponding to a user departing from a location where the pet is located; receiving second user location information; based on the second user location information, identifying a second point in time corresponding to the user returning to the location where the pet is located, wherein a period of time including the first point in time through the second point in time comprises a departure period; and obtaining at least one image of the pet through the camera during the departure period, wherein the identifying the emotional state of the pet further comprises identifying the emotional state of the pet based on the at least one image of the pet obtained during the departure period.

According to an aspect of the disclosure, a robot includes: a camera; a driver configured to control a motion of the robot; a memory configured to store information on a plurality of motions of the robot and a plurality of emotional states of a pet corresponding to the plurality of motions of the robot; and a processor connected to the driver, the camera, and the memory, wherein the processor is configured to: receive a user input regarding a state of the pet, obtain through the camera at least one image of the pet within a predetermined time before or after receiving the user input, identify, based on the at least one image of the pet obtained within the predetermined time before or after receiving the user input and the information stored in the memory, an emotional state of the pet from among the plurality of emotional states of the pet, and control the driver to cause the robot to perform a motion of the robot corresponding to the identified emotional state from among the plurality of motions of the robot.

The robot may further include a microphone, and the user input may include an audio input received through the microphone.

The robot may further include a touch sensor, and the user input may include a predetermined user gesture received through the touch sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
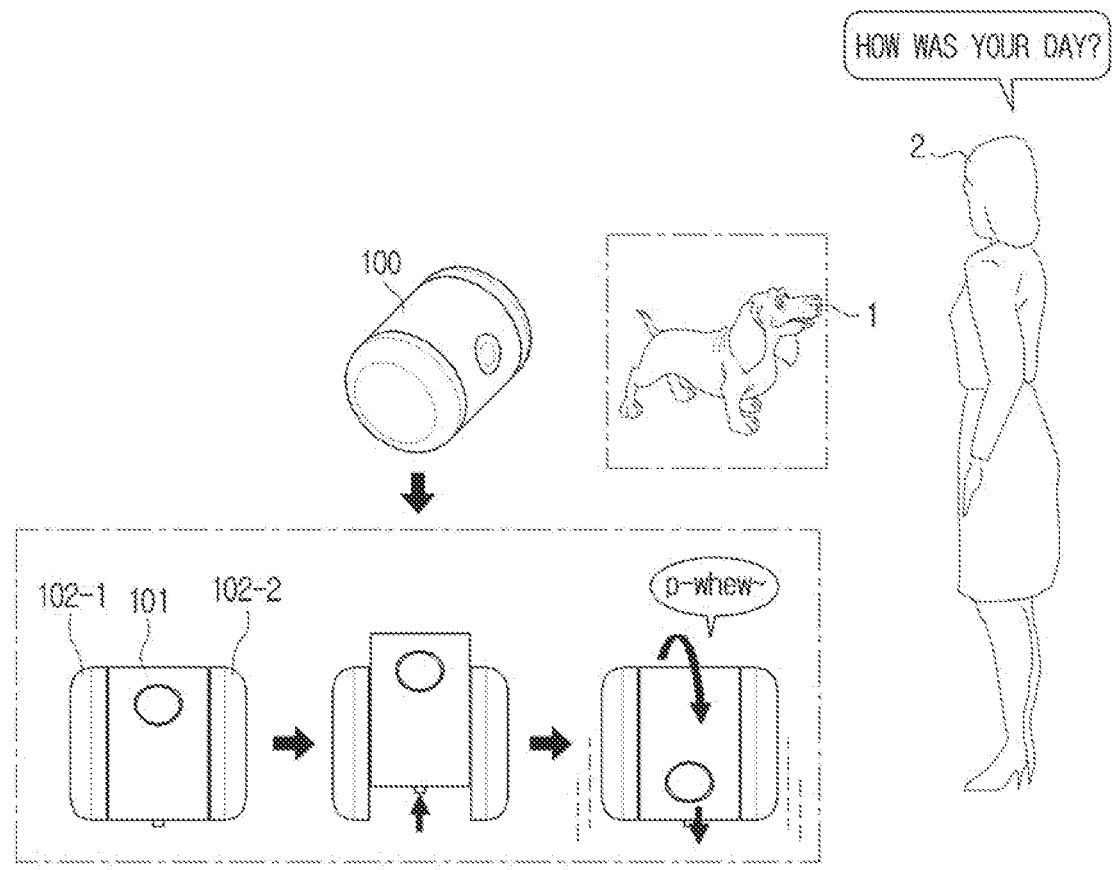
FIG. 1 is a diagram schematically illustrating an operation of a robot according to an embodiment of the disclosure.

The terms used in the specification and claims of the disclosure are selected as general terms in consideration of functions in various embodiments of the disclosure. However, these terms may depend on intentions of those skilled in the art or legal or technical interpretations, emergences of new technologies, and the like. Some of the terms are arbitrarily selected by the applicant. These terms may be construed as meanings defined in the present specification, and unless the terms are defined in detail, the terms may be construed based on general contents of the present specification and common technical knowledge of the art to which embodiments belong.

Also, the same reference numerals or symbols respectively illustrated in the attached drawings denote parts or elements that perform the same functions. For convenience of description and understanding, the parts or elements will be described by using the same reference numerals or symbols even in different embodiments. In other words, although elements having the same reference numerals are all illustrated in a plurality of drawings, the plurality of drawings do not mean one embodiment.

The terms including ordinal numbers, such as 'first', 'second', etc. May be used herein to distinguish elements from one another. These ordinal numbers are merely used to distinguish the same or similar elements from one another, and meanings of the terms are not construed as being limited by the using of the ordinal numbers. For example, use orders or arrangement orders of elements combined with these ordinal numbers are not limited by numbers thereof. The ordinal numbers may be replaced with one another.

As used herein, the singular forms are intended to include the plural forms as well, unless the context clearly indicates otherwise. It will be further understood that the terms "comprises," "comprising," etc. When used in this specification, specify the presence of stated features, integers, steps, operations, elements, and/or components, but do not preclude the presence or addition of one or more other features, integers, steps, operations, elements, components, and/or groups thereof.

In the embodiments of the disclosure, the term "module," "unit," or "part" refers to an element that performs at least one function or operation, and this element may be implemented with hardware, software, or a combination of hardware and software. In addition, a plurality of "modules," a plurality of "units," or a plurality of "parts" may be integrated into at least one module or chip, except for a "module" or a "part" which has to be implemented as particular hardware so as to be implemented as at least one processor.

It will be understood that when a part is referred to as being "coupled with/to" or "connected to" another part, the part may be connected to the another part directly or through another medium. In addition, as long as there are no particularly contrary descriptions, what a part includes an element may mean that the part further includes another element not excluding another element.

FIG. 1 is a diagram schematically illustrating an operation of a robot according to an embodiment of the disclosure. FIG. 1 shows a dog 1, a user 2 and a robot 100.

Referring to FIG. 1, the robot 100 may include a body 101 and wheels 102-1 and 102-2 respectively attached to left and right of the body 101.

The robot 100 may capture the dog 1 in real time through a camera and analyze an emotional state of the dog 1 using captured images.

Also, as shown in FIG. 1, when the user utters "How was your day?", the robot 100 may receive the user's voice through a microphone. The robot 100 may recognize the received user's voice using a conventional technology, such as automatic speech recognition (ASR).

Here, the robot 100 may perform a motion for expressing an emotional state of the dog 1 analyzed today according to the recognized user's voice.

For example, when the analyzed emotional state of the dog 1 is loneliness, the robot 100 may perform a motion indicating loneliness as shown in FIG. 1.

Specifically, referring to FIG. 1, the robot 100 may perform a motion of elevating the body 101 based on the wheels 102-1 and 102-2, and then perform a motion of lowering the body 101 and simultaneously bending the body 101 in a forward direction.

Also, referring to FIG. 1, the robot 100 may output a sound, such as "p-whew" using a speaker along with performing a motion.

As a result of the motion-based expression of the pet's emotional state by the robot 100, the user 2 may more intuitively and emotionally understand the emotion of the dog 1 who was lonely today and may be interested in the motion of the robot 100. In addition, the user 2 who is interested in the motion of the robot 100 may have a deeper interest in the emotions of the pet that appear according to the motion of the robot 100.

Through the following drawings, a more detailed configuration and operation of the robot 100 according to the disclosure will be described.

Figure 2A:
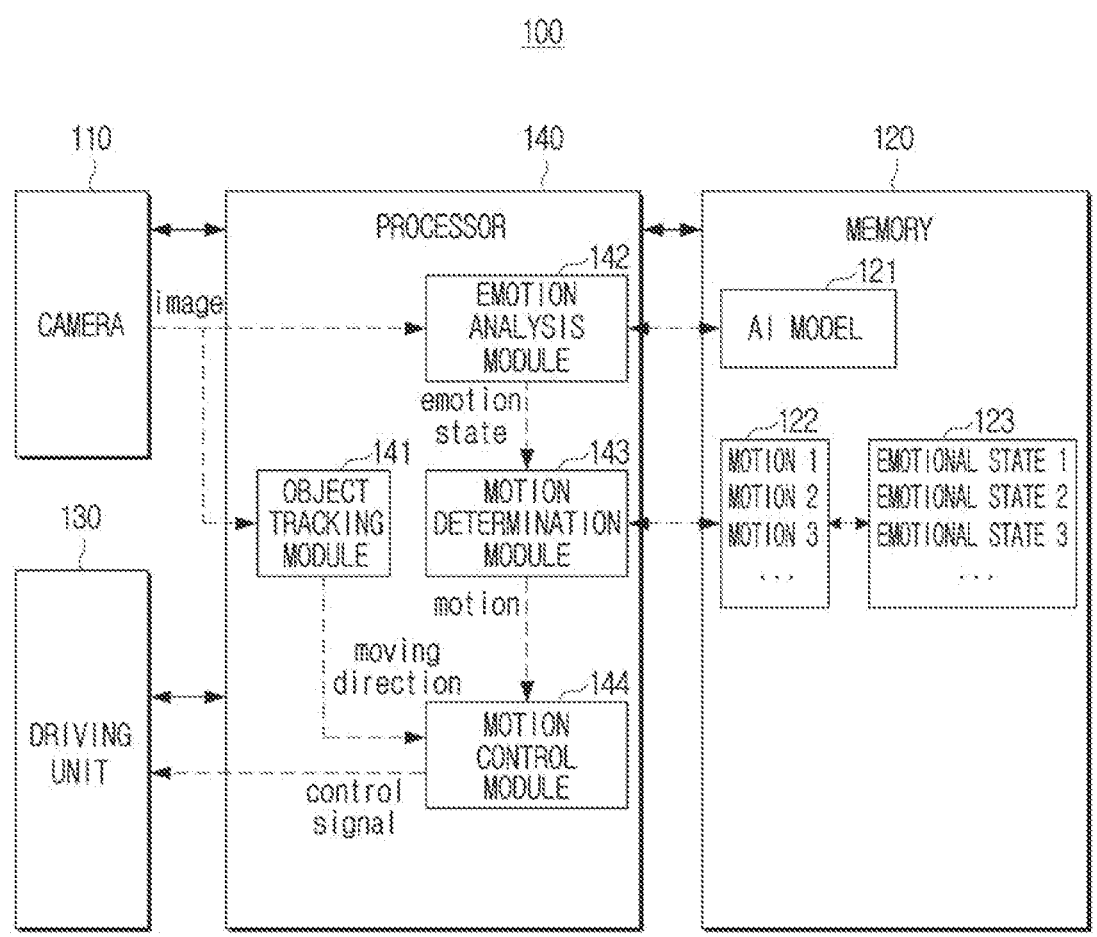
FIG. 2A is a block diagram illustrating a configuration of a robot according to an embodiment of the disclosure.

FIG. 2A is a diagram illustrating a configuration and operation of a robot according to an embodiment of the disclosure.

Referring to FIG. 2A, the robot 100 may include a camera 110, a memory 120, a driving unit or driver 130, and a processor 140.

The memory 120 may include an artificial intelligence (AI) model 121 trained to determine an emotional state of a pet when at least one image including a pet is input.

The emotional state of the pet may include various emotional states, such as joy, sadness, pain, loneliness, boredom, and sleepiness.

The AI model 121 may be implemented as a classifier for selecting at least one of these various emotional states, and at this time, the AI model 121 may output the probability that a pet corresponds to each emotional state in the form of a score for each emotional state.

The memory 120 may include information 122 on a plurality of motions that the robot 100 may perform.

Each of the plurality of motions may be defined through a movement of at least one of the body of the robot 100 and two wheels attached to the left and right of the body.

Each of the plurality of motions may include a combination of various motion elements, such as forward/backward inclination of the body based on the two wheels, left/right rotation of the body based on a speed difference between the two wheels, elevation/lowering of the body based on the two wheels, leftward/rightward inclination of the body, movement of the robot 100 in various directions according to the driving of two wheels.

Each of the motion elements described above may be controlled through the driving unit or driver 130, which may include a motor for providing drive power to the wheels and/or gears. The motion elements described above and mechanical operation examples of the configuration and operation of the driving unit 130 for performing each of the motion elements described above will be described below with reference to FIGS. 7, 8, 9A, and 9B.

A plurality of motions may be matched with a plurality of emotional states and stored in the memory 120. To this end, the memory 120 may include information 123 on a plurality of emotional states of the pet, and at least one motion may be matched for each emotional state.

For example, 'joy', an emotional state of a pet, may be matched with leftward/rightward inclination of the body and/or leftward/rightward rotation of the body.

The processor 140 may control the object tracking module 141, the emotion analysis module 142, the motion determination module 143, the motion control module 144, and the like. These modules may be stored in the memory 120 in the form of software or implemented in the form of hardware. Alternatively, these modules may be implemented as a combination of software and hardware.

The object tracking module 141 is a module for tracking an object, such as a pet or a person.

The object tracking module 141 may recognize and track a pet or person included in an image by using an RGB image and/or a depth image received through the camera 110.

For example, when an image is input, the object tracking module 141 may input an RGB image obtained through the camera 110 to at least one AI model trained to recognize a pet (dog, cat, etc.) or a person. As a result, the object tracking module 141 may recognize a pet or person included in the image according to an output from the AI model.

Here, the AI model may be a classifier model trained by using an image including a tracking target (a pet or person) as input data and information (e.g., a name) representing the tracking target (the pet or person) as output data.

For training of the AI model, the robot 100 may receive information (e.g., a name) on the tracking target (the pet or person) and an image including the tracking target in advance, and specific examples thereof will be described later with reference to FIGS. 3A to 3B.

The object tracking module 141 may identify a recognized movement of a pet or person using the RGB image and/or the depth image received through the camera 110.

For example, the object tracking module 141 may identify a positional change in the image of a pet included in a plurality of images sequentially captured (: at a specific frame rate) through the camera 110, and may determine a moving direction (moving at a specific speed in a specific direction) of the pet according to the identified positional change.

The processor 140 may control an image capturing direction of the camera 110 according to a moving direction of the object (e.g., the pet) determined by the object tracking module 141.

Specifically, the processor 140 may rotate/change a capturing angle of the camera 110 in a direction in which the pet moves.

Alternatively, the processor 140 may control the motion control module 144 so that the robot 100 moves according to the moving direction of the object (e.g., the pet) determined by the object tracking module 141.

Here, the processor 140 may rotate the camera 110 in the direction in which the pet moves or move the robot 100 so that the pet may be included in a predetermined central area in each of a plurality of images captured in real time through the camera 110.

For example, the motion control module 144 may control the driving unit 130 so that the robot 100 moves along with the movement of the pet.

In this case, the driving unit 130 may control the wheels of the robot 100 according to a control signal from the motion control module 144, and as a result, the robot 100 may capture the pet, while following the pet.

The emotion analysis module 142 is a module for analyzing an emotion of the pet to determine the emotional state of the pet.

The emotion analysis module 142 may determine the emotional state of the pet included in the image by analyzing the image received through the camera 110.

For example, the emotion analysis module 142 may determine the emotional state of the pet by inputting at least one image received from the camera 110 to the AI model 121 described above.

The emotion analysis module 142 may determine various emotional states of the pet that change in real time through a plurality of images sequentially captured through the camera 110.

In this case, the processor 140 may store information on the emotional state of the pet in the memory 120 by matching the information on a time-by-time basis.

In addition to this, the emotion analysis module 142 may determine the emotional state of the pet in various ways, and examples of a process in which the emotion analysis module 142 analyzes the emotional state will be described later with reference to FIGS. 5A to 5C.

When the emotion analysis module 142 identifies the emotional state in real time through the images captured in real time through the camera 110, a plurality of emotional states may be obtained because the emotional state of the pet may change every moment.

As such, when a plurality of emotional states of the pet are obtained, the emotion analysis module 142 may identify at least one emotional state to be provided as a motion, among the plurality of emotional states.

The emotional state to be provided as a motion may refer to an emotional state matched to a motion of the robot 100 to be driven by the motion control module 144 to be described later. That is, the emotional state to be provided as a motion refers to an emotional state to be expressed as a motion of the robot 100 at the present time.

Specifically, when a predetermined user input is received, the emotion analysis module 142 may identify an emotional state of the pet identified within a predetermined time range based on a time point at which the user input is received, among a plurality of emotional states, as an emotional state to be provided as a motion.

That is, the emotion analysis module 142 may identify an emotional state determined based on at least one image captured by the camera 110 within a predetermined time range based on the time point at which the predetermined user input is received. In addition, a motion according to the identified emotional state may be performed by the driving unit 130 to be described later.

The predetermined user input may be a user's voice inquiring about an emotional state of the pet. The user's voice may be received through the microphone of the robot 100.

For example, if a user's voice (e.g., How was bubby?) for inquiring about a state of the pet is input at 2:00 p.m., the processor 140 may identify an emotional state of bubby identified according to images captured for a predetermined time range (e.g., 3 hours: 11:00 a.m. to 2:00 p.m.) based on 2:00 p.m., as an emotional state to be provided as a motion.

The user's voice for inquiring about the state of the pet may be a user's voice that utters a predetermined text. The predetermined text may be, for example, query text, such as "How was your day?", "Has nothing happened?", "How are you?"

Specifically, the processor 140 may obtain text matched to the user's voice using a conventional voice recognition technology, such as automatic speech recognition (ASR). Also, the processor 140 may determine whether the obtained text matches a predetermined text.

Alternatively, the processor 140 may recognize the meaning of the aforementioned text based on conventional natural language understanding technology, and determine whether the input user's voice is a user's voice for inquiring about a state of the pet.

The emotion analysis module 142 may identify at least one emotional state by using time information extracted from the input user's voice.

For example, it may be assumed that a user's voice (e.g., How was bubby this morning?) inquiring about the pet's emotional state at a specific point in time is input.

In this case, the processor 140 may extract time information (i.e., today's morning) from the text translated from the user's voice using a conventional natural language understanding technology. Then, according to the extracted time information, the processor 140 may identify an emotional state of the pet determined during this morning as an emotional state to be provided as a motion.

The predetermined user input may be a predetermined user's gesture of touching the robot 100. For example, the predetermined user's gesture may be a touch stroking the robot 100 and may be detected through a touch sensor of the robot 100.

It is also possible that a motion of the robot 100 for expressing an emotional state of the pet is provided at regular intervals.

In this case, the emotion analysis module 142 may identify an emotional state of the pet determined within a predetermined time range based on a time point at which the robot 100 performs a motion by period as an emotional state to be provided as a motion.

The emotion analysis module 142 may identify an emotional state of the pet determined within a time range determined according to location information of the user, as an emotional state to be provided as a motion.

For example, the emotion analysis module 142 may identify an emotional state of the pet from a time point at which the user leaves a place where the pet is located to a time point at which the user returns, as an emotional state to be provided as a motion. Related specific embodiments will be described later with reference to FIG. 10A and the like.

A plurality of emotional states may be identified within a time range according to the aforementioned predetermined user input, the aforementioned period, or the aforementioned user location information.

In this case, although all of the plurality of identified emotional states may be provided as motions, the emotion analysis module 142 may select only one emotional state that has been maintained for the longest time, among the plurality of identified emotional states, as an emotional state to be provided as a motion.

For example, it may be assumed that emotional states of the pet for a predetermined time (e.g., 3 hours) from a time point at which a predetermined user's gesture of stroking the robot 100 is input is "depressed" (: 1 hour) and "happy" (: 2 hours).

In this case, the emotion analysis module 142 may identify "happy" that has been maintained for a longer time, as an emotional state to be provided as a motion.

The motion determination module 143 is a module for determining a motion of the robot 100 that matches an emotional state of the pet.

Specifically, the motion determination module 143 may determine a motion of the robot 100 matched with an emotional state identified or selected as an emotional state to be provided as a motion by the emotion analysis module 142.

To this end, the motion determination module 143 may receive information on an emotional state to be provided as motion from the emotion analysis module 142.

Also, the motion determination module 143 may identify (determine) a motion that matches a corresponding emotional state, among a plurality of motions stored in the memory 120.

Specifically, the motion determination module 143 may determine a motion matched to the corresponding emotional state using the information 122 on a plurality of motions stored in the memory 120 and the information 123 on a plurality of emotional states matched to the plurality of motions.

The motion control module 144 is a module for controlling the driving unit 130 that controls various movements of the robot 100.

The motion control module 144 may transmit a control signal to the driving unit 130 so that the robot 100 performs the motion determined by the motion determination module 143. Specifically, the motion control module 144 may control a movement of at least one of the body 101 and the two wheels 102-1 and 102-2 through the driving unit 130.

As a result, the robot 100 may perform a motion representing the emotional state of the pet according to the predetermined user input, predetermined period, or user's location information described above.

When a motion to be performed by the robot 100 is determined by the motion determination module 143, the robot 100 may track the user using the object tracking module 141.

At this time, the object tracking module 141 may identify whether the user is included in the image obtained through the camera 110. Also, the motion control module 144 may control the driving unit 130 to move until an image including the user is obtained.

In addition, when the user is recognized by the object tracking module 141, the motion control module 144 may control the driving unit 130 to perform a motion representing the emotional state of the pet.

Figure 2B:
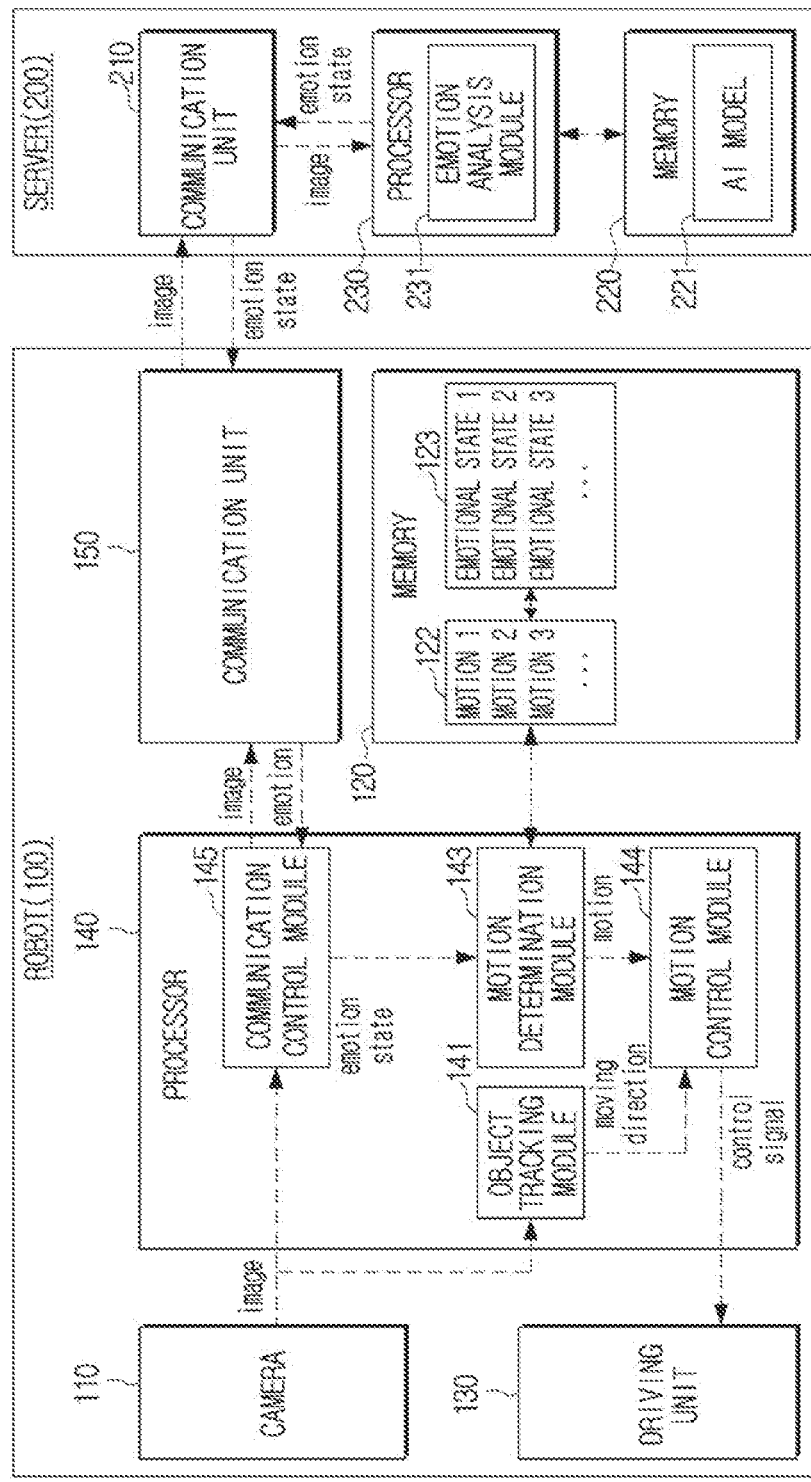
FIG. 2B is a block diagram illustrating a configuration of a robot that analyzes an emotional state through communication with a server according to an embodiment of the disclosure.

FIG. 2B is a diagram illustrating a case in which an emotion analysis operation performed by the robot 100 through the emotion analysis module 142 in FIG. 2A is performed through an external server 200.

Referring to FIG. 2B, the robot 100 may further include a communication unit or communicator 150 in addition to the camera 110, the memory 120, the driving unit 130, and the processor 140.

Here, the robot 100 may communicate with the external server 200 through the communication unit 150. To this end, the processor 140 may use a communication control module 145 for controlling the communication unit 150.

Referring to FIG. 2B, the server 200 may include a communication unit 210, a memory 220 and a processor 230.

Referring to FIG. 2B, the operations performed by the emotion analysis module 142 of the robot 100 in FIG. 2A may be performed through an emotion analysis module 231 of the server 200.

Specifically, the communication control module 145 may control the communication unit 150 to transmit at least one image obtained as a result of capturing the pet through the camera 110 to the server 200.

Here, the communication control module 145 may transmit the image of the pet obtained through the camera 110 to the server 200 according to various conditions.

For example, the communication control module 145 may transmit an image of the pet corresponding to a predetermined time period (e.g., 5 minutes) to the server 200 every predetermined period (e.g., 30 minutes). In this case, the emotion analysis module 231 of the server 200 may analyze the image at each corresponding period to determine an emotional state of the pet.

As another example, the communication control module 145 may transmit an image of the pet captured through the camera 110 to the server 200 in real time according to a communication state with the server 200. As a specific example, the robot 100 may transmit an image of the pet to the server 200 only when the amount of data that may be transmitted and received per unit time exceeds a predetermined amount of data according to communication with the server 200.

As another example, the processor 140 may transmit an image or video of the pet to the server 200 through the communication unit 150 when it is determined that the pet takes a predetermined motion, and a related embodiment will be described later with reference to FIG. 6.

When an image captured by the camera 110 is received by the server 200 through the communication unit 210 of the server 200, the processor 230 of the server 200 may determine an emotional state of the pet included in the image through the emotion analysis module 231.

At this time, the emotion analysis module 231 may use the AI model 221 stored in the memory 220 of the server 200.

Like the AI model 121 described above with reference to FIG. 2A, the AI model 221 may be an AI model trained to determine an emotional state of a pet.

Unlike FIG. 2B, the motion determination module 143 in addition to the emotion analysis module 142 may also not be included in the robot 100. In this case, the server 200 may perform the operation of the motion determination module 143 described above.

Figure 3A:
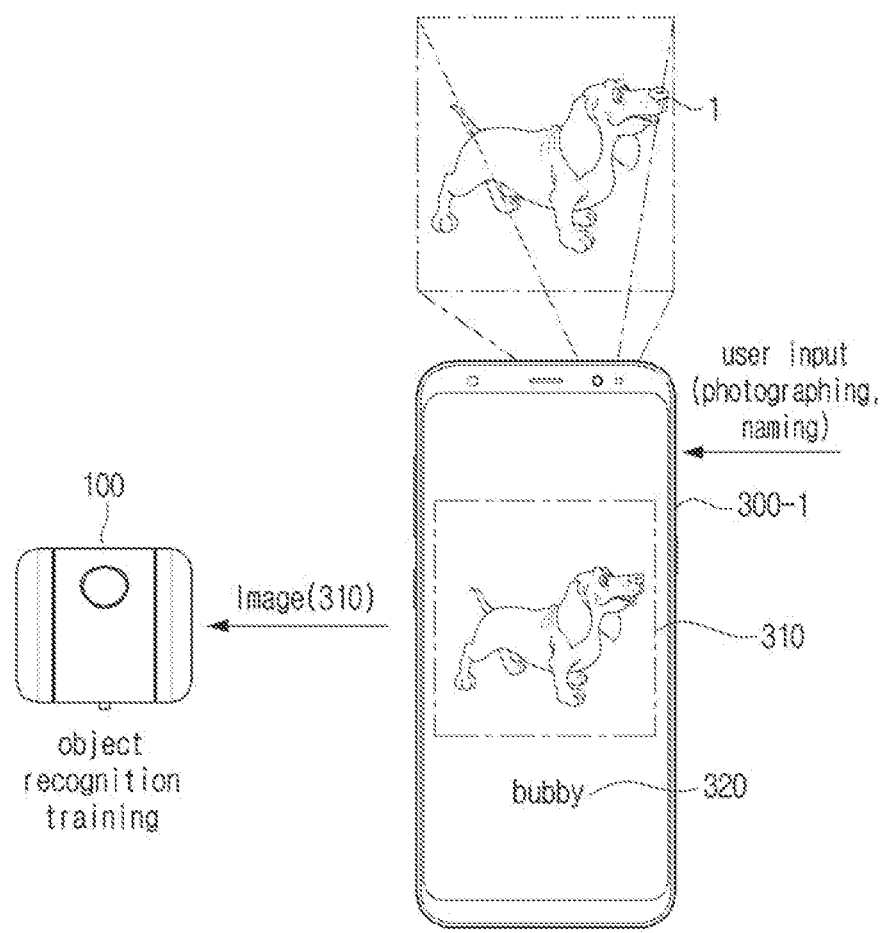
FIGS. 3A to 3B are diagrams illustrating embodiments in which a robot registers a monitoring target according to the disclosure.
Figure 3B:
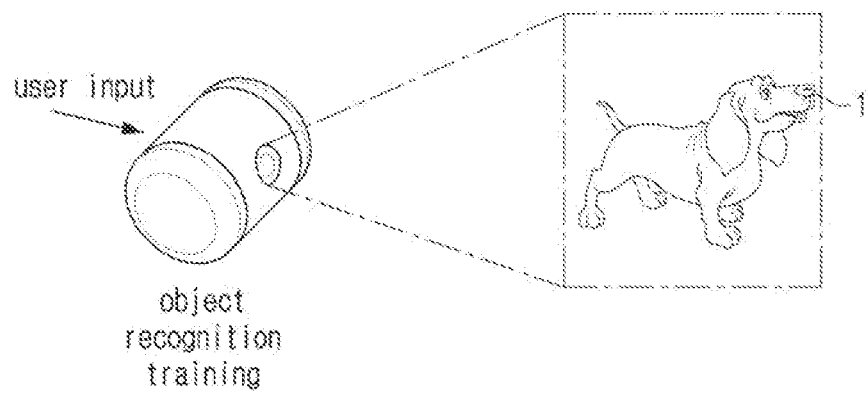

FIGS. 3A and 3B are diagrams illustrating embodiments in which a robot according to the disclosure registers a tracking and monitoring target.

FIG. 3A shows the robot 100 and a user terminal device 300-1 capable of communicating with the robot 100.

Referring to FIG. 3A, the user terminal device 300-1 may capture the dog 1 upon receiving a user input for image capturing. As a result, an image 310 of the dog 1 may be obtained.

In addition, the user terminal device 300-1 may register the name "hubby" of the dog 1 according to a user input for inputting the name of the dog 1.

In this case, the user terminal device 300-1 may transmit the name and image 310 of the dog 1 to the robot 100.

At this time, the robot 100 may train an AI model for object recognition using the received image 310 as input data and the dog's name "bubby" as output data.

Unlike FIG. 3A, the robot 100 may directly capture an image of the dog 1 to be registered.

Specifically, referring to FIG. 3B, as a user input for capturing is received, the robot 100 may train the AI model using an image of the dog 1 captured through the camera 110 of the robot 100.

In this case, a user input for registering the name of the dog 1 may also be directly received through the robot 100.

FIGS. 3A and 3B show only the registration of the dog 1 as a pet, but the user's name and user's image may also be registered in the robot 100.

Figure 4:
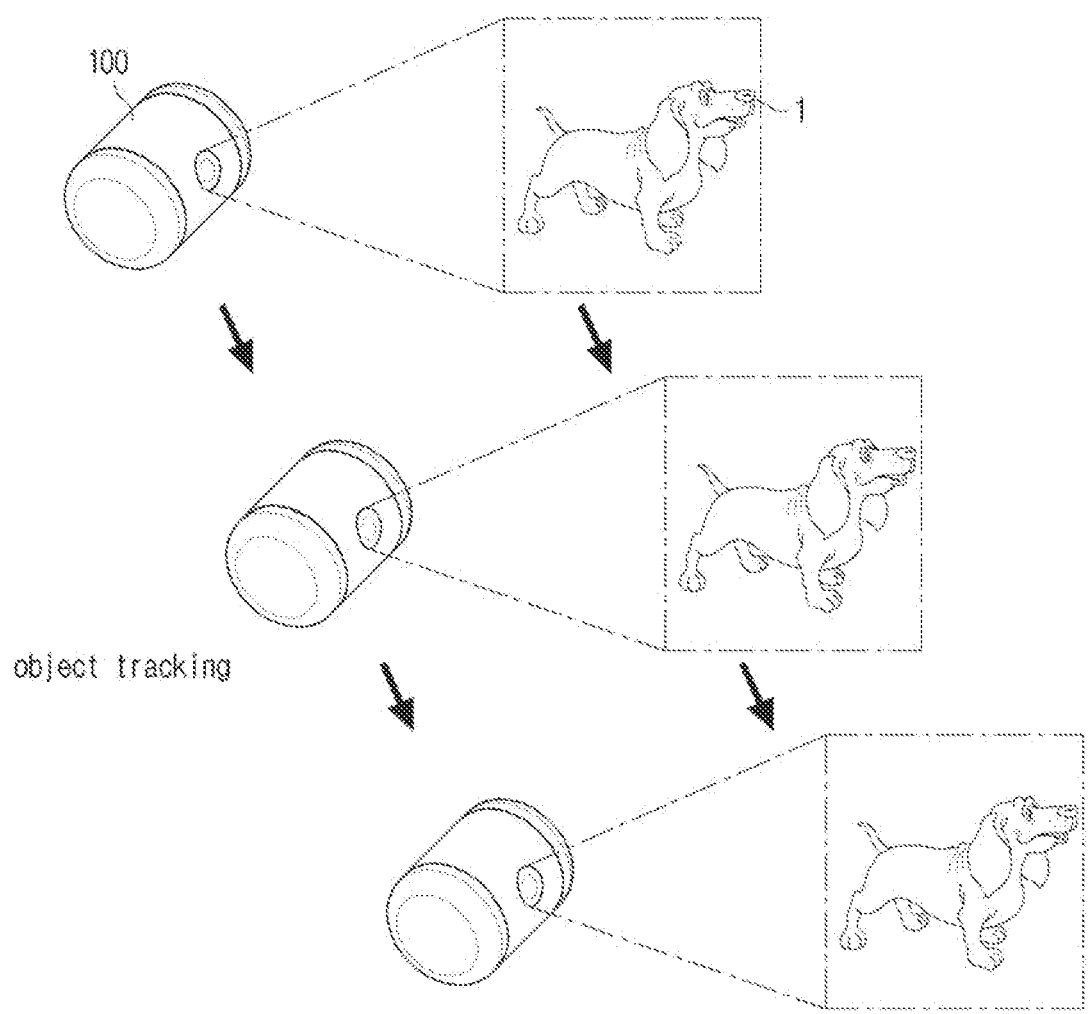
FIG. 4 is a diagram illustrating an operation in which a robot captures a pet, while tracking the pet, which is a monitoring target, according to an embodiment of the disclosure.

FIG. 4 is a diagram illustrating an operation of capturing a pet, while tracking the pet, which is a monitoring target, by a robot according to an embodiment of the disclosure.

Referring to FIG. 4, the robot 100 may capture an image of the dog 1 in real time through the camera 110, while tracking the registered dog 1 as shown in FIGS. 3A and 3B.

In this case, the object tracking module 141 may recognize and track the dog 1 using the AI model for object recognition trained through an image of the dog 1.

Figure 5A:
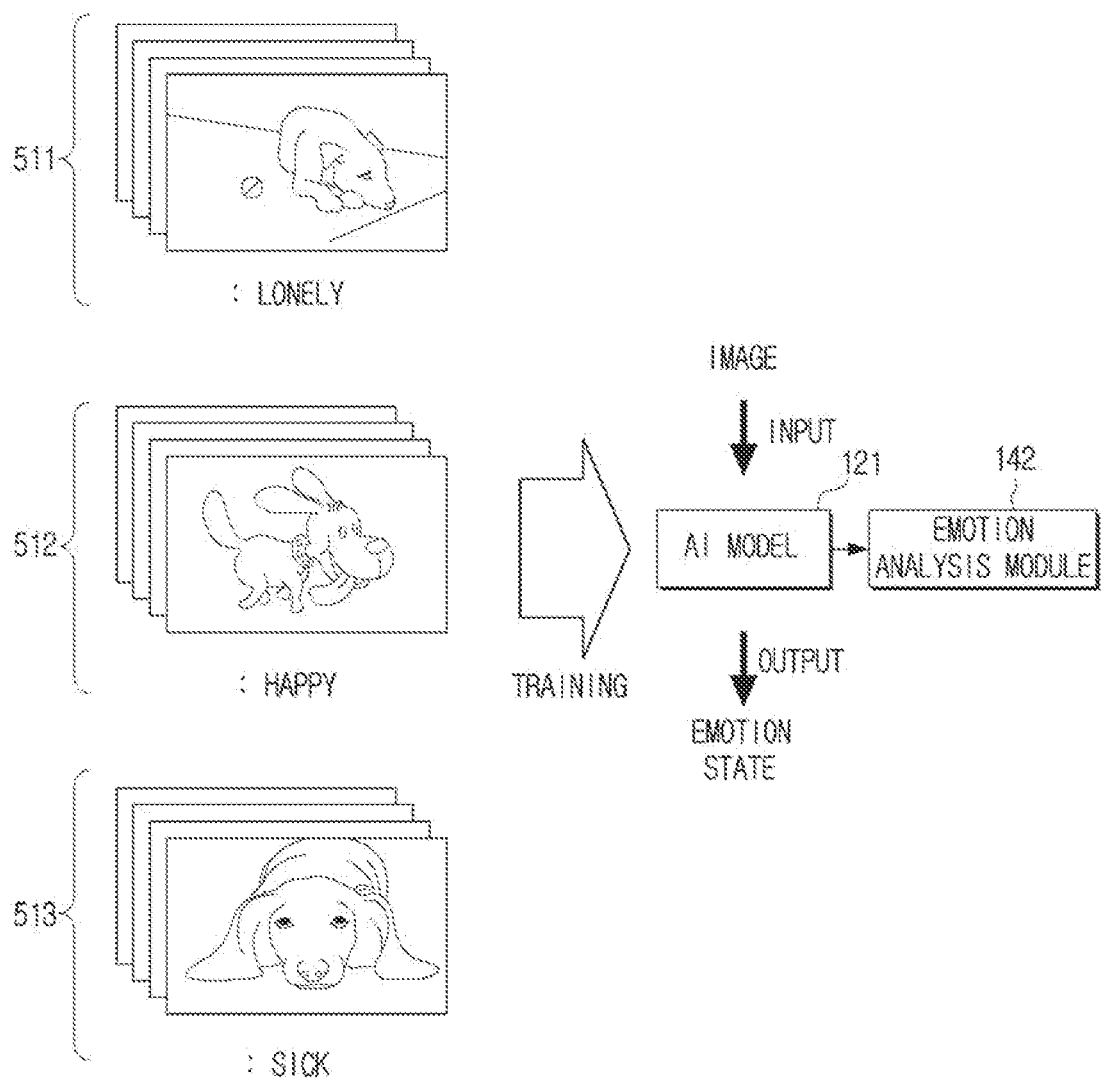
FIG. 5A is a diagram illustrating an operation in which a robot uses an artificial intelligence (AI) model trained to determine an emotional state according to an input image according to an embodiment of the disclosure.

FIG. 5A is a diagram illustrating an example of a process in which the aforementioned AI model 121 for analyzing an emotional state is trained.

The AI model 121 may be trained using images classified according to emotional states as input data and emotional states represented by each of the classified images as output data.

As a specific example, referring to FIG. 5A, the AI model 121 may be trained through images 511 matched to loneliness, images 512 matched to happiness, and images 513 matched to pain. In this case, the images 511 matched to loneliness may be images of a pet captured when the pet is lonely.

As a result, the AI model 121 may be trained to output an emotional state of the pet included in an input image when an image is input.

In addition, the emotion analysis module 142 may determine an emotional state of the pet by inputting the image obtained through the camera 110 to the trained AI model 121 as shown in FIG. 5A.

Although FIG. 5A shows only the case where the AI model 121 determines an emotional state according to receiving one image, the AI model 121 may be trained using sets of images, each set including multiple images classified by emotional states. Specifically, the AI model 121 may be trained using images classified according to emotional states as input data.

Unlike FIG. 5A, the emotion analysis module 142 may determine emotion by defining a motion of the pet.

Figure 5B:
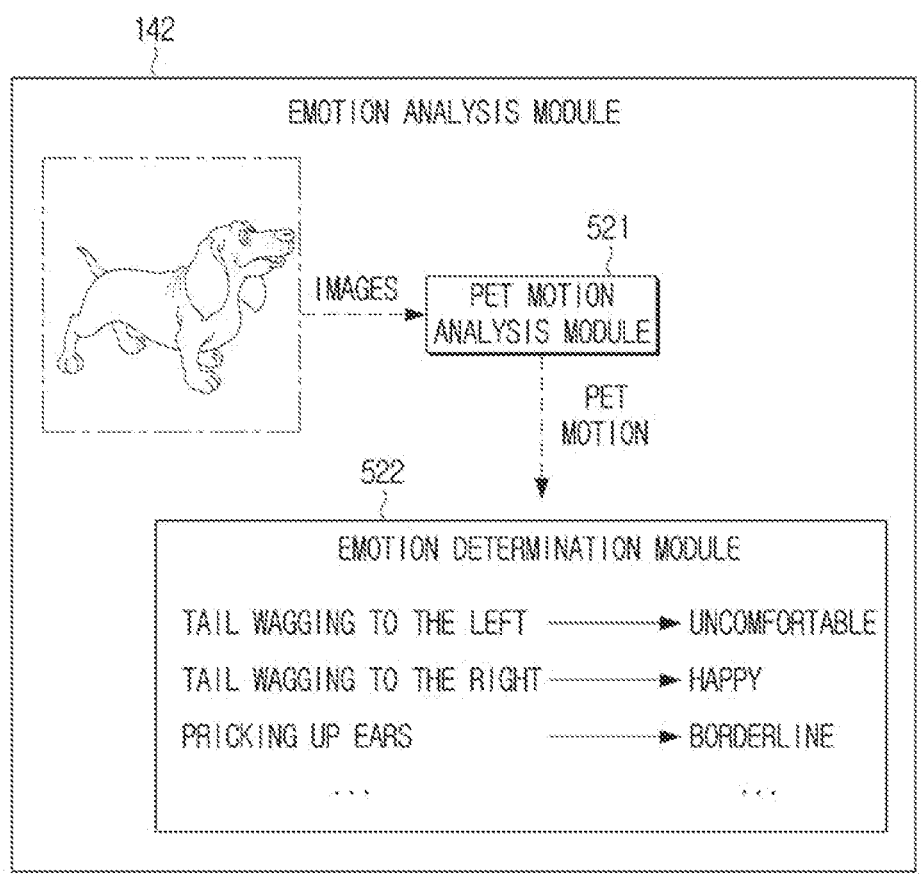
FIG. 5B is a diagram illustrating an operation in which a robot defines a motion of a pet and determines an emotional state according to the defined motion according to an embodiment of the disclosure.

In this regard, FIG. 5B is a diagram illustrating an operation in which a robot defines a motion of a pet and determines an emotional state according to the defined motion, according to an embodiment of the disclosure.

Referring to FIG. 5B, the emotion analysis module 142 may include a pet motion analysis module 521 and an emotion determination module 522.

The pet motion analysis module 521 is a module for determining a motion of a pet by using a plurality of images captured through the camera 110.

For example, the pet motion analysis module 521 may identify each body part (e.g., legs, body, eyes, nose, mouth, ears, tail, etc.) of a pet (e.g., a dog) included in an image, and determine a motion (e.g., closing eyes, sniffing, erecting ears, erecting tail, etc.) of the pet according to a movement or a change in shape of each body part.

To this end, the pet motion analysis module 521 may use at least one AI model trained to identify each body part of the pet included in the image.

In this case, the pet motion analysis module 521 may determine a movement or change in shape of each body part by identifying a position and shape of each body part included in sequentially captured images.

Alternatively, when an image including sequentially captured images is input, the pet motion analysis module 521 may use at least one AI model trained to determine a motion of a pet included in the corresponding image. This AI model may be trained using, as training data, images including each motion (e.g., tail wagging to the left, ears pricked, yawning, etc.) of a pet (e.g., a dog).

The emotion determination module 522 may determine an emotional state of the pet mapped to a motion of the pet determined through the pet motion analysis module 521.

To this end, the emotion determination module 522 may use information on the emotional state mapped for each motion of the pet.

As a specific example, referring to FIG. 5B, a motion of 'wagging the tail to the left' may be mapped to 'uncomfortable', a motion of 'wagging the tail to the right' may be mapped to 'happiness', and a motion of 'keeping the ears up' may be mapped to 'alert', but is not limited thereto and may be defined/mapped in various ways.

The emotion analysis module 142 may determine an emotional state of the pet by using a sound emitted by the pet.

Specifically, when the sound of the pet is input through the microphone of the robot 100, the emotion analysis module 142 may input an audio signal converted from the sound through the microphone to the AI model trained to determine the emotional state.

Figure 5C:
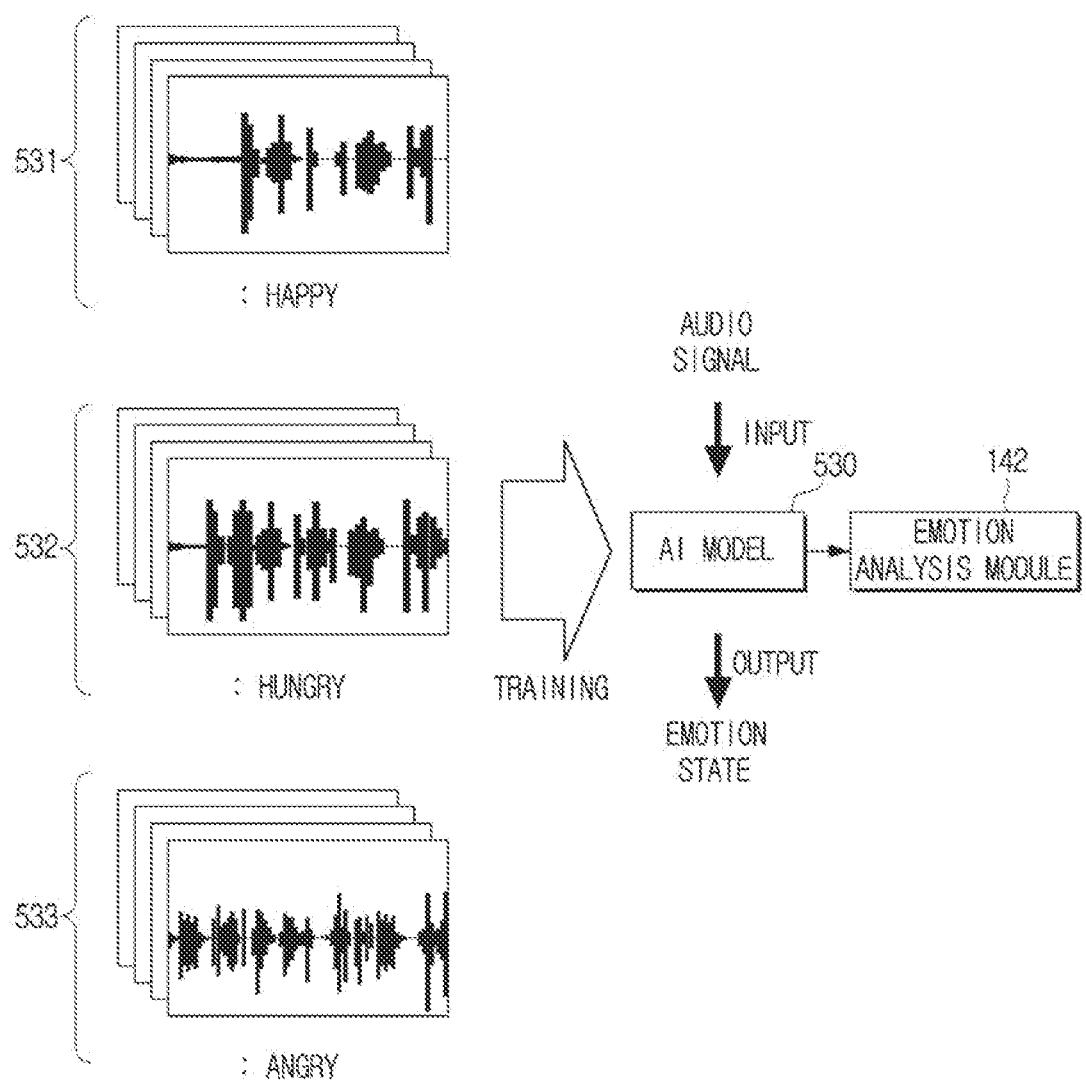
FIG. 5C is a diagram illustrating an operation in which a robot uses an AI model trained to determine an emotional state through a sound made by a pet according to an embodiment of the disclosure.

In this regard, FIG. 5C is a diagram illustrating an operation in which a robot uses an AI model trained to determine an emotional state through a sound made by a pet according to an embodiment of the disclosure.

The AI model 530 of FIG. 5C may be trained using audio signals classified according to emotional states as input data and emotional states represented by each of the classified audio signals as output data.

Specifically, referring to FIG. 5C, the AI model 530 may be trained through audio signals 531 matched to happiness, audio signals 532 matched to hunger, and audio signals 533 matched to anger.

As a result, when an audio signal is input, the AI model 530 may output an emotional state (of the pet) matched to the input audio signal.

Only one of the operational embodiments of the emotion analysis module 142 described above with reference to FIGS. 5A to 5C may not be necessarily implemented.

That is, as a result of using two or more of the embodiments of FIGS. 5A to 5C together, the emotion analysis module 142 may determine an emotional state of the pet.

For example, the emotion analysis module 142 may use all of the AI models 121 and 530 of FIGS. 5A and 5C. That is, the emotion analysis module 142 may determine an emotional state of the pet by using both an image captured through the camera 110 and a sound input through the microphone.

As a specific example, it may be assumed that an emotional state output by the AI model 121 of FIG. 5A is 'loneliness', the reliability output by the AI model 121 for the output emotional state (: loneliness) is 70%, an emotional state output by the AI model 530 of FIG. 5C is 'bored', and the reliability output by the AI model 530 for the output emotional state (bored) is 60%. In this case, the emotion analysis module 142 may determine 'loneliness', which has higher reliability, as an emotional state of the pet.

The robot 100 may further include a health analysis module in addition to the emotion analysis module 142. Similar to the emotion analysis module 142 described above, the health analysis module may determine a physical condition of the pet using an image captured by the camera 110 and/or sound input through the microphone.

In this case, the health analysis module may use an AI model trained to determine a physical condition of the pet when at least one image including the pet is input.

Alternatively, the health analysis module may determine a motion of the pet and determine a physical condition by using the determined motion. For example, if the pet is identified as walking with one front leg raised, while walking, the health analysis module may determine that the pet has a health problem or that the pet is suffering from patella dislocation symptoms.

In addition, the health analysis module may use an AI model trained to determine a physical condition of the pet when an audio signal for the sound of the pet is input.

When the emotion analysis module 231 is included in the server 200, instead of the robot 100, as shown in FIG. 2B described above, the emotion analysis module 231 included in the server 200 may determine an emotional state of the pet using the method as shown in FIGS. 5A to 5C described above.

For example, the emotion analysis module 231 of the server 200 may analyze an audio signal of the pet received from the robot 100 to determine an emotional state of the pet.

In a case in which the emotion analysis module 231 of the server 200 determines an emotional state of the pet using an image of the pet received from the robot 100 and when it is determined that the pet takes a predetermined motion, the robot 100 may transmit an image of the pet to the server 200.

Figure 6:
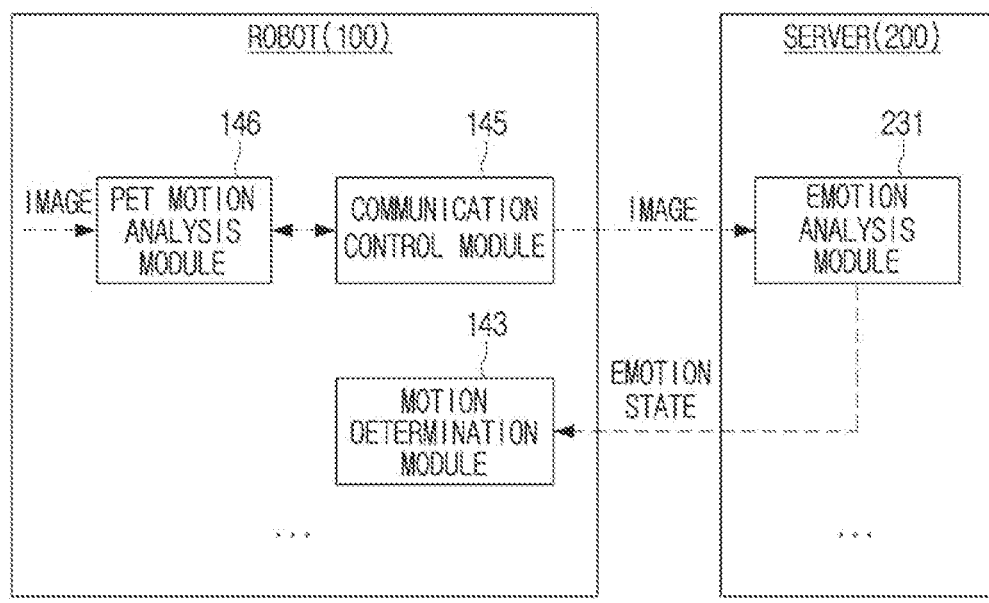
FIG. 6 is a block diagram illustrating an example in which a robot analyzing an emotional state through communication with a server selectively transmits an image according to a motion of a pet according to an embodiment of the disclosure.

In relation to this, FIG. 6 is a block diagram illustrating an example in which a robot analyzing an emotional state through communication with a server selectively transmits an image to the server according to a motion of a pet according to an embodiment of the disclosure.

Referring to FIG. 6, the robot 100 may further include a pet motion analysis module 146 in addition to the components shown in FIG. 2B.

The pet motion analysis module 146 is a module for determining a motion of a pet by using a plurality of images captured through the camera 110.

The pet motion analysis module 146 is a module that may perform the same operation as that of the pet motion analysis module 521 described above with reference to FIG. 5B. However, in the case of FIG. 6, since the emotion analysis module 142 included in the robot 100 is not used as in FIG. 5B, the pet motion analysis module 521 included in the emotion analysis module 142 and the pet motion analysis module 146 of FIG. 6 in the disclosure should be understood as concepts corresponding to different embodiments.

In the case of FIG. 6, the communication control module 145 may transmit an image of the pet to the server 200 only when a motion of the pet determined through the pet motion analysis module 146 is a predetermined motion (e.g., not moving for a predetermined time or longer, lying face down, ears pricked, etc.).

In this case, the communication control module 145 may transmit to the server 200 an image including images captured within a predetermined time range based on a time point at which it is determined that a motion of the pet corresponds to the predetermined motion.

In addition, the emotion analysis module 231 of the server 200 may analyze the image (e.g., an image of the pet taking a predetermined motion) received from the robot 100 to determine an emotional state of the pet.

In this case, information on the emotional state determined by the emotion analysis module 231 may be transmitted to the motion determination module 143 of the robot 100.

According to various embodiments described above, when the emotional state of the pet is determined in real time through the robot 100 and/or the server 200, at least one emotional state to be provided as a motion may be identified, and the motion determination module 143 may determine a motion of the robot 100 that matches the identified emotional state.

Figure 7:
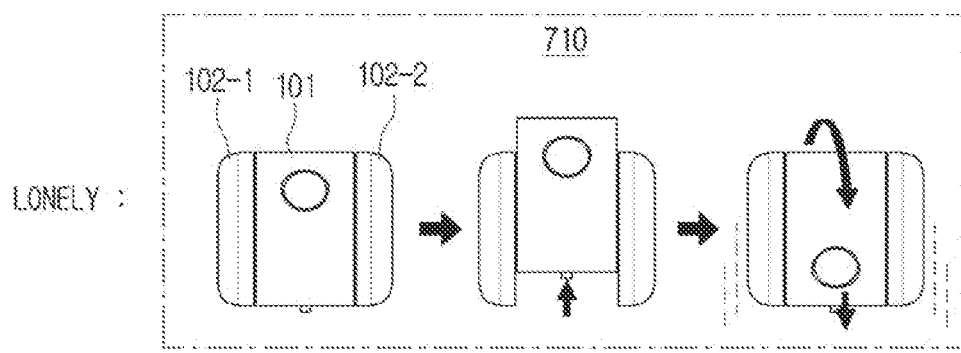
FIG. 7 is a diagram illustrating specific examples of motions of a robot that may be matched for each emotional state of a pet.
Figure 7:
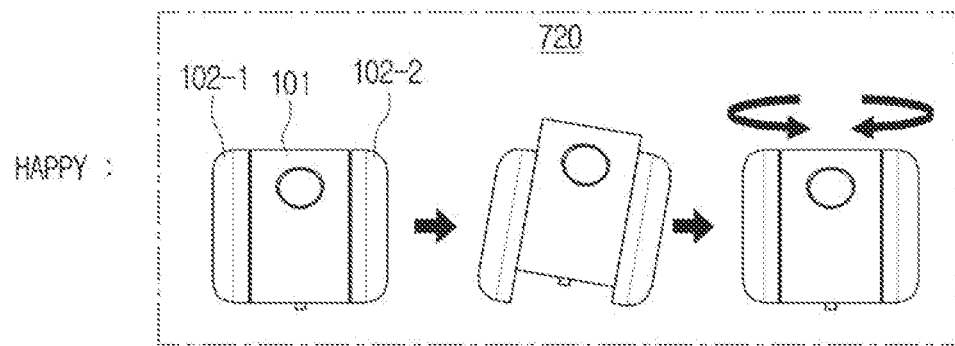

In this regard, FIG. 7 is a diagram illustrating specific examples of motions of a robot that may be matched for each emotional state of a pet.

Referring to FIG. 7, a motion 710 indicating 'loneliness' may be a motion in which the body 101 of the robot 100 ascends and then descends, while bending forward.

Referring to FIG. 7, a motion 720 representing 'happiness' may be a motion in which the body 101 of the robot 100 is inclined to the left and/or right and then rotates left and right.

However, the motions of FIG. 7 are merely examples, and motions representing each emotional state may be defined in various other forms.

The motion control module 144 may control the driving unit 130 to drive the robot 100 according to the motion determined by the motion determination module 143.

In this case, the driving unit 130 may perform unit motions constituting a motion representing an emotional state under the control of the motion control module 144.

Figure 8:
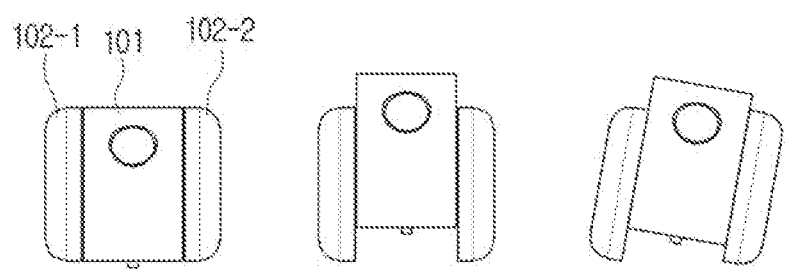
FIG. 8 is a diagram illustrating examples of unit motions constituting each motion of a robot.
Figure 8:
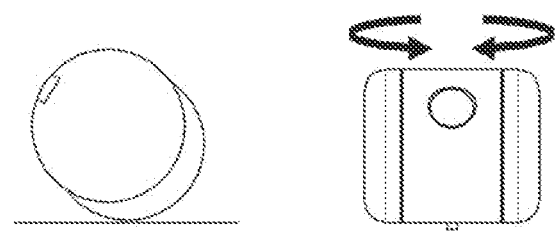

FIG. 8 is a diagram illustrating examples of various unit motions constituting motions of a robot matched for each emotional state. Each of the motions described above with reference to FIG. 7 includes one or more unit motions.

The unit motion may be defined as a motion unit of the robot 100 that may be described as one motion in appearance or a minimum motion unit that may be classified according to a mechanical driving principle of the driving unit 130.

Referring to FIG. 8, based on a basic state 810, an upward motion 820 of the body 101, a motion 830 in which the body 101 is inclined to the left (or right), a motion 840 in which the body 101 is inclined in a forward direction (viewed from the side), a motion 850 in which the robot 100 rotates in a leftward or rightward direction, and the like may each be one unit motion. However, the disclosure is not limited thereto.

For example, the motion 710 representing 'loneliness' in FIG. 7 may include unit motions 810, 820, and 840 in FIG. 8.

For example, the motion 720 representing "happiness" in FIG. 7 may include the unit motions 810, 830, and 850 in FIG. 8.

Figure 9A:
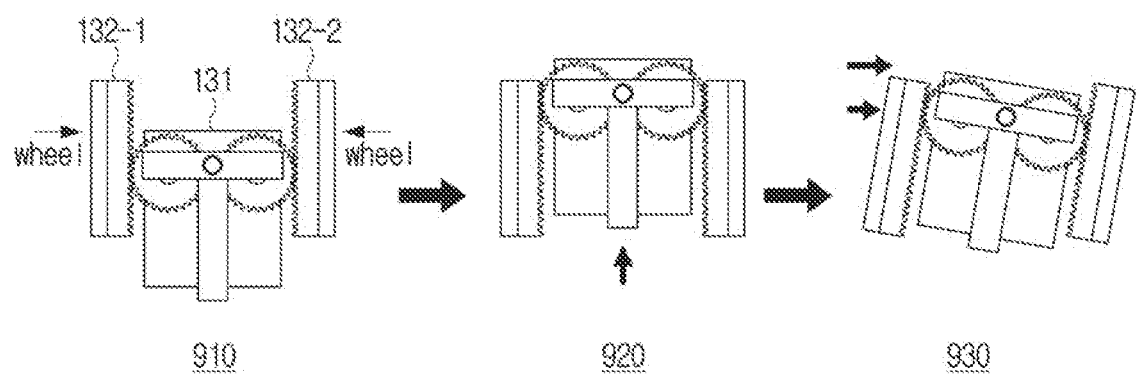
FIGS. 9A to 9B are diagrams schematically illustrating a mechanical operation and configuration of a robot for performing each unit motion.
Figure 9B:
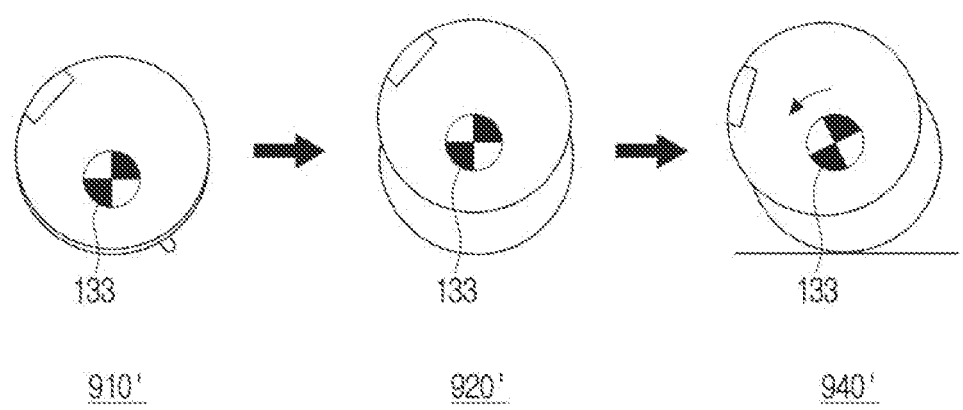

FIGS. 9A and 9B are diagrams schematically illustrating a mechanical operation and configuration of a robot for performing each unit motion. FIGS. 9A and 9B show a portion of an internal configuration of the robot 100.

Referring to FIG. 9A, the robot 100 may include connection portions 132-1 and 132-2 connecting a central portion 131 included in the body 101, the body 101, and respective wheels 102-1 and 102-2.

Referring to FIG. 9A, a state 910 shown on the left shows a state corresponding to the unit motion 810 described above.

In the state 910, as the teeth of the central portion 131 rotate under the control of the driving unit 130, the central portion 131 engages with the teeth of the connection portions 132-1 and 132-2 and rises, and as a result, the central portion 131 is in a raised state 920. Transition from the state 910 to the state 920 corresponds to the unit motion 820 described above.

Also, in the state 920, as only one of the teeth of the central portion 131 rotates under the control of the driving unit 130, only a relative position of the central portion 131 for the connection portion 132-2, among the connection portions 132-1 and 132-2, is lowered to result in an unbalanced state. The transition to this state 930 corresponds to the unit motion 830 described above.

FIG. 9B shows a side view of the robot 100, and shows a weight 133 included in the robot 100 together.

Referring to FIG. 9B, a state 910' shown on the left shows a state corresponding to the unit motion 810 described above.

In the state 910', as the central portion 131 and the body 101 rise under the control of the driving unit 130, the weight 133 included in the body 101 may also rise together, resulting in state 920'. The transition from the state 910' to the state 920' corresponds to the unit motion 920 described above.

Also, in the state 920', as the weight 133 rotates in a front downward direction and/or moves in the forward direction under the control of the driving unit 130, the center of gravity of the body 101 moves to the front to be bent (940'). The transition to the state 940' corresponds to the unit motion 940 described above.

The unit motion 850 of FIG. 8 may be implemented by a speed difference between the wheels 102-1 and 102-2. To this end, the driving unit 130 may differently control a rotation speed of the motor connected to each of the wheels 102-1 and 102-2.

The processor 140 may control the driving unit 130 to perform a motion corresponding to an emotional state of the pet based on location information of the user. The user's location information may be received by the robot 100 from an external server.

The processor 140 may receive location information from a server capable of communicating with a terminal device of the user or an external device that detects the user through a communication unit.

Here, the processor 140 may control the driving unit 130 to perform a motion corresponding to an emotional state of the pet, only when the user is located at a place where the pet is located and/or at a place where the robot 100 is located according to location information of the user.

Figure 10A:
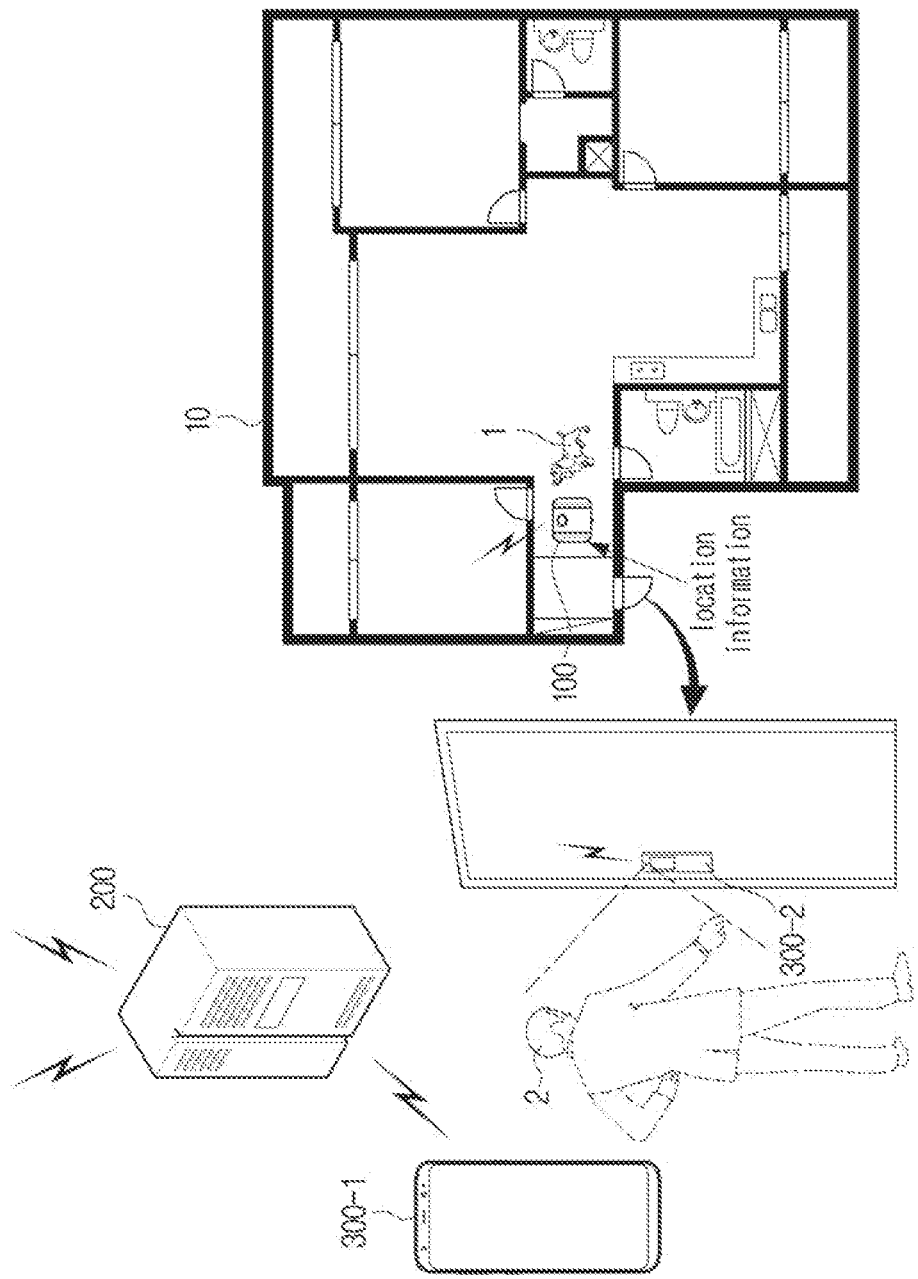
FIG. 10A is a diagram illustrating an operation in which a robot obtains location information of a user according to an embodiment of the disclosure.

In this regard, FIG. 10A is a diagram illustrating an operation of obtaining location information of a user by a robot according to an embodiment of the disclosure.

FIG. 10A shows the dog 1 and the robot 100 located in a house 10. FIG. 10A shows a server 200 capable of communicating with the robot 100, a user terminal device 300-1 capable of communicating with the server 200, and a door lock device 300-2.

The user terminal device 300-1 may obtain location information of the user terminal device 300-1 by using a GPS sensor or location information of an access point (AP) (e.g., a wireless router) connected through Wi-Fi.

In addition, the server 200 may identify the location information of the user terminal device 300-1 received from the user terminal device 300-1 as the user's location information.

The door lock device 300-2 may detect the user entering or exiting through a front door. To this end, the door lock device 300-2 may include a display panel including a touch sensor or a fingerprint sensor, a camera, and the like.

As a specific example, when a user input is detected through a touch sensor or a fingerprint sensor, the door lock device 300-2 may capture an exterior direction of the front door through the camera.

Also, the door lock device 300-2 may recognize a user 2 using an image captured through the camera. In this case, when the image is input, at least one AI model trained to recognize a user included in the input image may be used.

In this manner, when the door lock device 300-2 recognizes the user 2 entering through the front door, the server 200 may identify the return of the user through communication with the door lock device 300-2. Also, the server 200 may identify the user's location information as the house 10.

As another example, when it is detected that the door lock device 300-2 is opened by internal operation, the door lock device 300-2 may capture an inside direction of the front door using a camera installed in the inside direction of the front door.

In this manner, when the door lock device 300-2 recognizes the user 2 going out through the front door, the server 200 may identify the user 2 going out through communication with the door lock device 300-2. In this case, the server 200 may determine that the user's location information is no longer the house 10.

The server 200 that identifies the user's location according to the embodiments described above may transmit the user's location information to the robot 100.

In addition, the robot 100 may provide a motion corresponding to the emotional state of the pet according to the user's location information.

According to an embodiment, when the user returns after leaving the place where the pet is located (e.g., the house 10 of FIG. 10A), the processor 140 may identify an emotional state of the pet from a time point at which the user has left the house 10 to a time point at which the user returns to the house 10.

Also, the processor 140 may control the driving unit 130 to perform a motion that matches the identified emotional state of the pet.

According to one embodiment, when it is identified that a user who has left the place where the pet is located has returned to the place after a predetermined period of time, the processor 140 may control the driving unit to perform a motion matched to the emotional state of the pet.

Here, the emotional state of the pet matched to the motion may be an emotional state identified based on at least one image captured through the camera 110 from the time point at which the user leaves the corresponding place to the time point at which the user returns.

The robot 100 may perform a motion as the user is recognized through the camera 110.

As a specific example, as shown in FIG. 10A, when the user 2 returns to the house 10 from outside, the robot 100 may track the user entering the house 10.

For example, the robot 100 may be programmed to approach the front door when the user 2 returns to the house 10 from outside.

To this end, map information of the house 10 may be included in the memory 120 of the robot 100. The map information of the house 10 may include, for example, a structure of the housing 10 and topographical information on structures inside the house 10. For example, the robot 100 may identify the structure and structures of the house 10 using a LiDAR sensor or the like. The map information of the house 10 may include information on the locations of various electronic devices (e.g., the door lock device 300-2, a refrigerator, an air-conditioner, etc.) capable of communicating with the server 200 based on an IoT system. Here, the robot 100 may identify the location of the door lock device 300-2 as a location of the front door.

The map information may also be used when the robot 100 tracks and monitors a pet. At this time, the robot 100 may avoid an unnecessary collision by recognizing a geographic feature according to the map information.

Figure 10B:
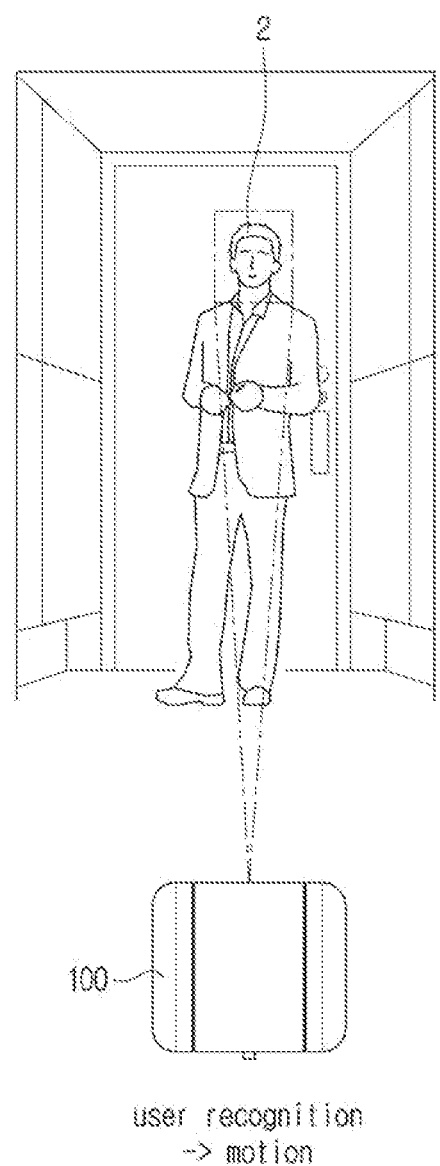
FIG. 10B is a diagram illustrating an operation in which a robot provides a motion as the robot recognizes a user according to an embodiment of the disclosure.

FIG. 10B is a diagram illustrating an operation in which a robot provides a motion as the robot recognizes a user according to an embodiment of the disclosure.

Referring to FIG. 10B, when it is detected that the user 2 enters the house 10 as shown in FIG. 10A, the robot 100 may approach the front door and capture at least one image through the camera 110.

In addition, when the user 2 is recognized through a captured image, the robot 100 may perform a motion matched to the emotional state of the pet while the user 2 is out.

Specifically, the robot 100 may perform a motion matched to the emotional state of the pet analyzed through images captured by the camera 110 while the user 2 is out.

As a result, as soon as the user 2 returns from going out, information on an emotional state of the pet while the user 2 is absent may be provided.

However, when an unregistered person other than the user 2 is additionally recognized, the robot 100 may not perform a motion matched to the emotional state.

Figure 10C:
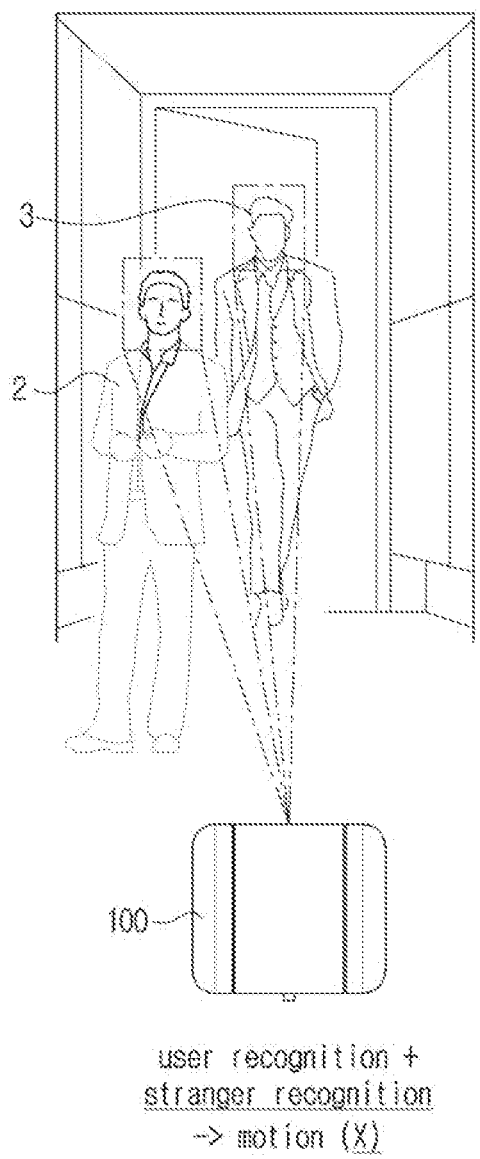
FIG. 10C is a diagram illustrating a case in which a motion is not provided as a robot recognizes a stranger in addition to a user according to an embodiment of the disclosure.

In this regard, referring to FIG. 10C, if a stranger 3 other than the pre-registered user 2 is recognized as shown in FIG. 10C, the robot 100 may not perform a motion matched to the emotional state of the pet.

According to the embodiments described above, the robot 100 may privately provide a motion matched to an emotional state of a pet according to a user's situation.

According to an embodiment of the disclosure, the server 200 capable of communicating with the robot 100 of the disclosure may provide various information on pets through the user terminal device 300-1.

In addition, the server 200 may control the robot 100 according to a user command input through the user terminal device 300-1.

Figure 11A:
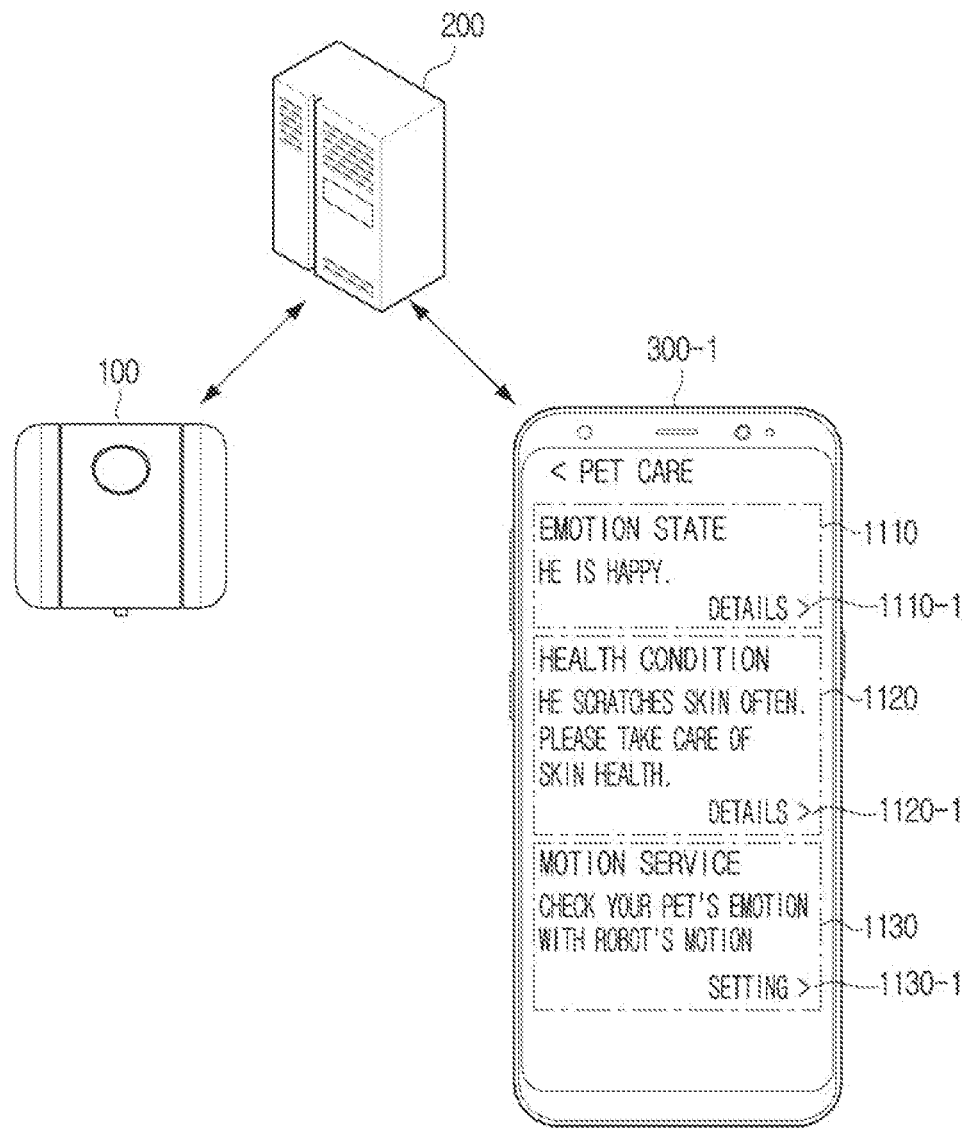
FIG. 11A is a diagram illustrating an operation in which a server provides information on an emotional state of a robot through an application executed in a user terminal device according to an embodiment of the disclosure.

In this regard, FIG. 11A is a diagram illustrating an operation in which a server provides information on an emotional state of a pet through an application executed in a user terminal device according to an embodiment of the disclosure.

Referring to FIG. 11A, information on an emotional state and/or physical condition of a pet monitored by the robot 100 may be provided to the user terminal device 300-1 through the server 200.

Specifically, as an application for pet care is executed in the user terminal device 300-1, the server 200 may transmit corresponding information to the user terminal device 300-1.

Referring to FIG. 11A, when an application for pet care is executed in the user terminal device 300-1, the user terminal device 300-1 may provide a user interface (UI) 1110 indicating an emotional state of the pet, a UI 1120 indicating a physical condition of the pet, a UI 1130 related to motion services of the robot 100 for the pet, and the like.

Here, when an item "Details" 1110-1 in the UI 1110 is selected according to a user input received by a method, such as a touch, the user terminal device 300-1 may receive more detailed information on the emotional state of the pet from the server 200 and display the same.

For example, the user terminal device 300-1 may display information on an emotional state of the pet by time.

Alternatively, when the item "details" 1120-1 in the UI 1120 is selected according to a user input, the user terminal device 300-1 may receive more detailed information on the physical condition of the pet from the server 200 and display the same.

When an item "Setting" 1130-1 in the UI 1130 is selected according to a user input, the user terminal device 300-1 may provide a UI for the user to set a motion of the robot 100, which will be described later with reference to FIG. 11B.

As shown in FIG. 11A, the robot 100 may perform a motion matched to an emotional state of the pet according to the number or frequency of information on the emotional state/physical condition provided through the user terminal device 300-1.

For example, when an application for pet care (FIG. 11A) is not executed through the user terminal device 300-1 for a predetermined period of time (e.g., 24 hours), the robot 100 may perform a motion matched to an emotional state of the pet.

In this case, there is an effect that the emotional state/physical condition of the pet may be actively informed to the user who has been indifferent to the pet for a long time.

Figure 11B:
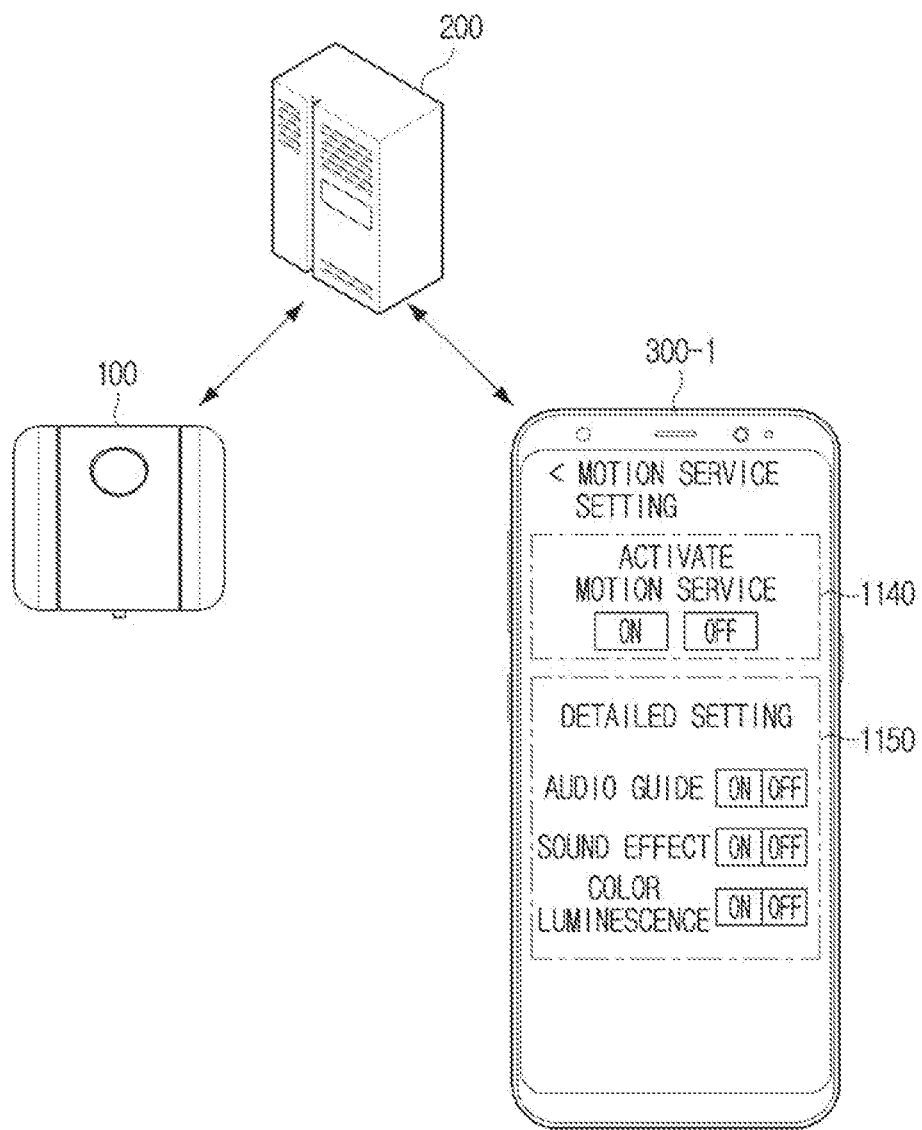
FIG. 11B is a diagram illustrating a way in which a server sets motion provision of a robot according to a user input received from a user terminal device according to an embodiment of the disclosure.

FIG. 11B is a diagram illustrating a way in which a server sets motion provision of a robot according to a user input received from a user terminal device according to an embodiment of the disclosure.

FIG. 11B shows an example of a screen displayed by the user terminal device 300-1 as a result of selecting the item "Setting" 1130-1 in FIG. 11A.

Referring to FIG. 11B, the user terminal device 300-1 may provide a motion service activation UI 1140 and a detailed setting UI 1150 of motion services through communication with the server 200.

Through the motion service activation UI 1140, whether to provide the motion service of the robot 100 may be selected.

Specifically, in a state where 'ON' in the UI 1140 is selected, through the server 200, the robot 100 may be set to automatically perform a motion matched to the emotional state according to the embodiments described above.

For example, when the motion service is activated (: ON), the robot 100 may perform a motion matched to an emotional state of the pet at predetermined intervals.

When the motion service is deactivated (: OFF), the robot 100 may not perform a motion matched to an emotional state of the pet. However, in FIG. 11B, the ON/OFF type of UI is simply expressed, but, for example, instead of the OFF item, a 'do not disturb mode' item that deactivates the motion of the robot 100 may be defined and selectively provided.

A UI for setting conditions (e.g., a period, user's location, pet's emotional state, etc.) for the robot 100 to perform a motion may be provided through the user terminal device 300-1.

For example, the period may be set to 2 hours and the user's location may be set to 'home' according to a user input received through a corresponding UI. In this case, the robot 100 may perform a motion expressing an emotional state of the pet every two hours on the premise that the user is at 'home'.

Through the detailed setting UI 1150 of FIG. 11B, it is possible to set various actions to be provided together when the robot 100 performs a motion.

For example, when the voice guide is set to ON, the robot 100 may provide a voice describing an emotional state together with a motion.

For example, when sound effects are set to ON, the robot 100 may provide sound effects (non-verbal sounds) matched to an emotional state together with a motion.

For example, when color light emission is set to ON, the robot 100 may output light of a color matched to an emotional state together with a motion.

Figure 12:
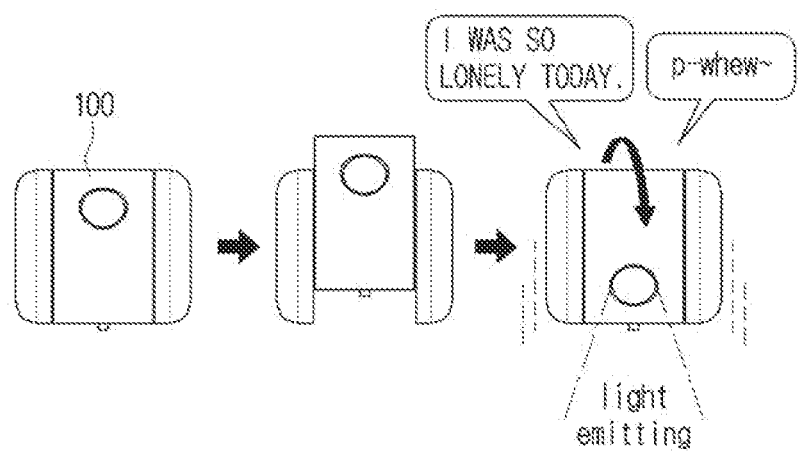
FIG. 12 is a diagram illustrating an operation in which a robot additionally provides elements, such as description, non-verbal sound, and light emission in addition to a motion according to an embodiment of the disclosure.

In relation to this, FIG. 12 is a diagram illustrating an operation in which a robot according to an embodiment of the disclosure additionally provides elements, such as description, non-verbal sound, and light emission in addition to a motion.

According to an embodiment, the processor 140 may control a speaker to output a sound corresponding to an identified emotional state and control a light emitting unit to output light of a color corresponding to an identified emotional state, while the robot 100 performs a motion corresponding to the identified emotional state.

Here, the sound may include a voice describing an emotional state, a non-verbal sound expressing an emotional state, and the like.

A color corresponding to an emotional state may be previously determined for each emotional state. For example, happiness may be previously set to blue, sadness to orange, and anger to red.

FIG. 12 assumes a case in which a voice guide, sound effects, and color emission are all set to ON through the detailed setting UI 1150 described above.

Referring to FIG. 12, while performing a motion matched to the pet's emotional state (: loneliness), the robot 100 may output "I was so lonely today", which is a voice describing an emotional state (:loneliness) and "p-whew~", a non-verbal sound indicating an emotional state (: loneliness), through the speaker.

In addition, the robot 100 may control the light emitting unit to output light of a color (e.g., orange) expressing an emotional state (e.g., loneliness).

As such, the robot 100 according to the disclosure may use various types of expression methods in addition to a motion, so that the emotional state of the pet may be expressed more emotionally and richly.

The processor 140 may generate and provide clip videos for each emotional state according to a change in a monitored emotional state.

Specifically, the processor 140 may determine whether the emotional state of the pet has changed based on a plurality of images obtained by sequentially capturing the pet through the camera 110. At this time, the emotion analysis module 142 or 231 described may be used.

When it is determined that the emotional state has changed, the processor 140 may identify at least one image captured within a predetermined time range based on a time point at which the emotional state was changed, among the plurality of images.

Also, the processor 140 may generate a clip video corresponding to the changed emotional state based on the identified image. Specifically, the processor 140 may store a video including the identified images in the memory 120 as a clip video matched to the changed emotional state.

Figure 13:
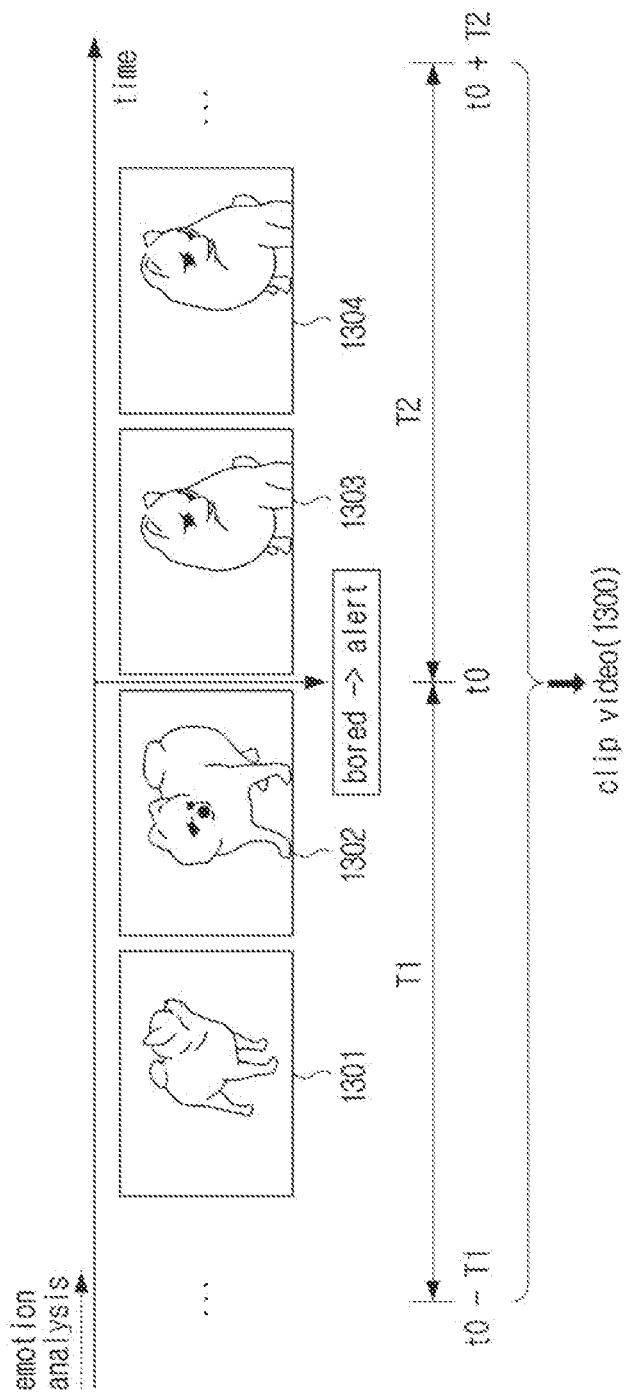
FIG. 13 is a diagram illustrating an operation in which a robot generates a clip video according to an emotional state according to an embodiment of the disclosure.

In this regard, FIG. 13 is a diagram illustrating an operation in which the robot generates a clip video according to an emotional state according to an embodiment of the disclosure.

FIG. 13 assumes a case in which the robot 100 analyzes an emotional state of a pet through images (video) captured in real time through the camera 110.

Referring to FIG. 13, the robot 100 may identify that the emotional state of the pet has changed from "bored" to "alert" at time point t0.

In this case, the robot 100 may identify a first time point (t0−T1) before a predetermined time (: T1) from time point t0 and a second time point (t0+T2) after a predetermined time (: T2) from time point t0. Here, T1 and T2 may be the same or different, and thus may be previously determined to be various.

Also, the robot 100 may generate a clip video 1300 including images . . . , 1301, 1302, 1303, 1304, . . . captured during a time interval from the first time point (t0−T1) to the second time point (t0+T2).

In this case, the robot 100 may store the corresponding clip video 1300 as a clip video matched to "alert".

When the clip video is generated as shown in FIG. 13, the clip video including all of the situation that caused the "alert" and the appearance of the pet on alert may be created.

The processor 140 may provide the clip video through at least one display device.

Specifically, the processor 140 may transmit the clip video to at least one display device through the communication unit 150.

Also, while the clip video is displayed on the display device, the processor 140 may control the driving unit 130 so that the robot 100 performs a motion corresponding to the changed emotional state.

Figure 14A:
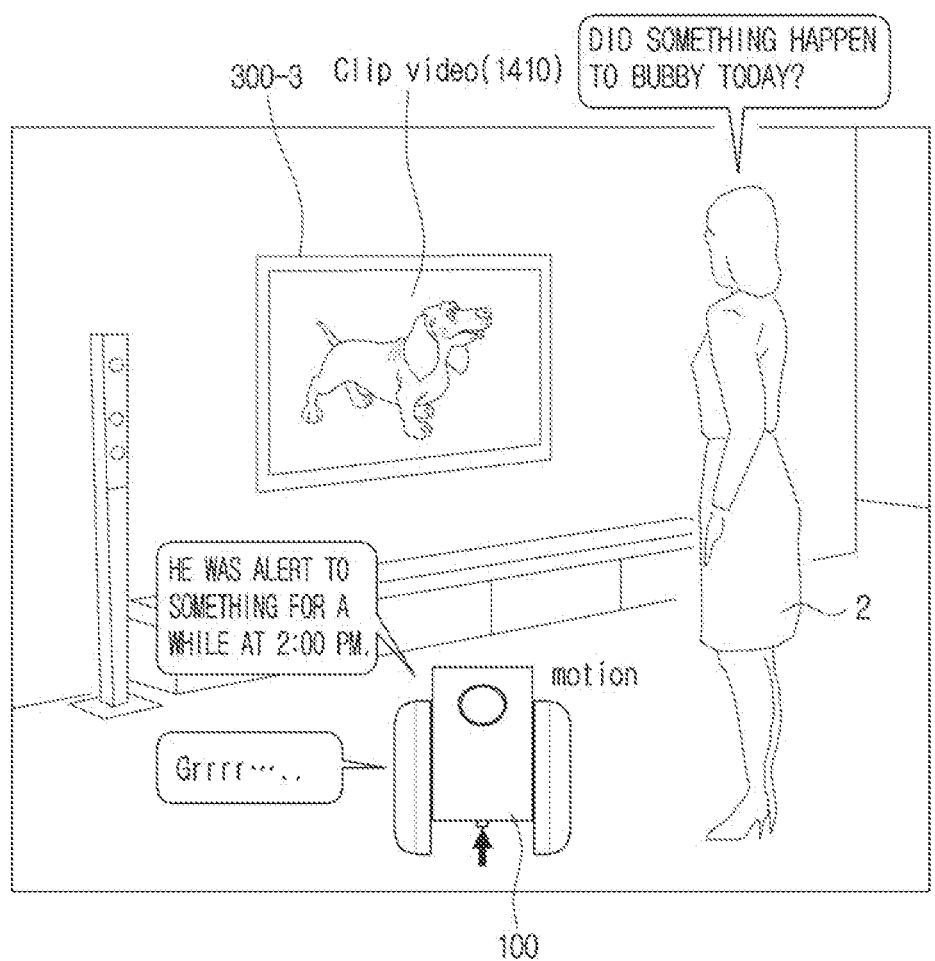
FIG. 14A is a diagram illustrating an operation in which a robot provides a motion, while a clip video is provided through a display device according to an embodiment of the disclosure.

In this regard, FIG. 14A is a diagram illustrating an operation in which the robot according to an embodiment of the disclosure provides a motion while a clip video is provided through a display device.

Referring to FIG. 14A, when a user's voice "Did something happen to bubby today?" is input, the robot 100 may identify the emotional state (e.g., alert) of the pet analyzed today.

Here, the robot 100 may transmit a clip video matched to the emotional state (: alert) identified today to a display device 300-3, which is a TV.

At this time, the display device 300-3 may display a clip video 1410, and the robot 100 may perform a motion matched to the emotional state (alert) while the clip video is displayed.

In addition, the robot 100 may also output a voice ("He was alert to something for a while at 2:00 p.m.") and a sound ("Grrr . . . ") explaining the emotional state.

Figure 14B:
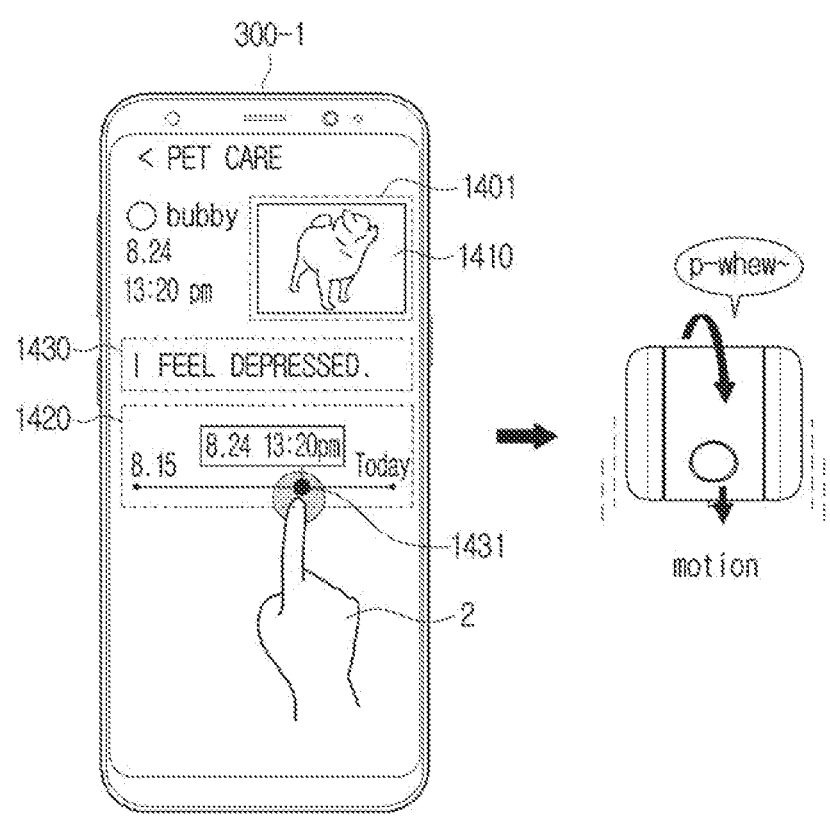
FIG. 14B is a diagram illustrating an operation in which a robot provides a motion, while a clip video is provided in an application executed in a user terminal device according to an embodiment of the disclosure.

FIG. 14B is a diagram illustrating an operation in which a robot according to an embodiment of the disclosure provides a motion together while a clip video is provided in an application executed on a user terminal device.

Referring to FIG. 14B, when an application for pet care is executed in the user terminal device 300-1, the user terminal device 300-1 may display a video UI 1401 for providing a full video (video for today) of the pet captured by the robot 100 and a video control UI 1420 for controlling a playback timing of the video UI.

To this end, the user terminal device 300-1 may receive the full video captured by the robot 100 through the server 200.

The video control UI 1420 is a UI for selecting a time point of a video to be provided through the video UI 1401.

For example, when an input of the user 2 touching a specific time point 1430 of the video control UI 1420 is received, a video 1410 at a time point matched to a corresponding point 1430, among the full video, may be played through the video UI 1401.

In addition, the user terminal device 300-1 may receive information on an emotional state (depression) of the pet at a corresponding time from the server 200.

In addition, the user terminal device 300-1 may display information ("I feel depressed") indicating the emotional state of the pet at the corresponding time 1430 as shown in FIG. 14B.

As such, while the video 1410 at the corresponding time is being played through the user terminal device 300-1, the server 200 may control the robot 100 to perform a motion matched to the emotional state (depressed) at the corresponding time.

As a result, the user watching the video in which the pet was captured through the user terminal device 300-1 may understand more intuitively with fun about the past emotional states of the pet through the motion of the robot 100 performed according to the emotional state of the pet in the played video.

Figure 15:
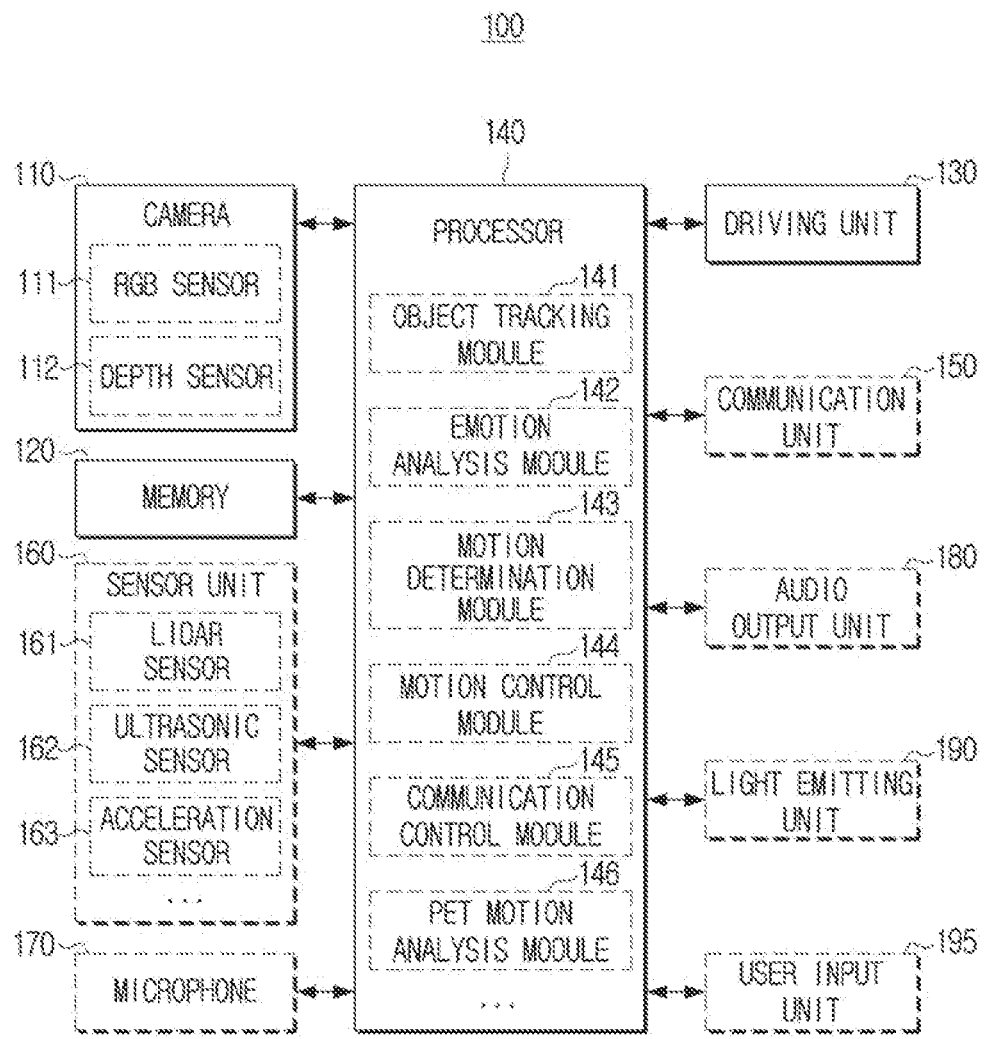
FIG. 15 is a block diagram illustrating various components of a robot according to various embodiments of the disclosure.

FIG. 15 is a block diagram illustrating various components of a robot according to various embodiments of the disclosure.

Referring to FIG. 15, the robot 100 may further include a communication unit 150, a sensor unit 160, a microphone 170, an audio output unit 180, a light emitting unit or light emitter 190, a user input unit or user input interface 195, and the like, in addition to the camera 110, the memory 120, the driving unit or driver 130, and the processor 140.

The camera 110 may include an RGB sensor 111, a depth sensor 112, and the like.

According to an example, RGB image data obtained through the RGB sensor 111 may be input to an AI model for object recognition or emotion analysis.

According to an example, depth information obtained through the depth sensor 112 may be used by the robot 100 to identify structure/structures therearound. Here, the depth sensor 112 may be configured as a time of flight (TOF) sensor, and the depth information may include information on depth for each pixel of the image.

Specifically, the camera 110 may include a TOF camera including the depth sensor 112 and an infrared light in addition to an RGB camera including the RGB sensor 111. A depth camera may measure depth using disparity of images obtained using a plurality of cameras, and in this case, the depth camera may include an IR stereo sensor. Alternatively, the depth camera may be implemented in a structured light method that measures depth by capturing a light pattern projected by a projector with a camera.

The memory 120 may store various information related to the function of the robot 100. The memory 120 may include a hard disk, SSD, flash memory, etc. in addition to ROM and RAM.

The memory 120 may store one or more AI models. A function of the stored AI model may be performed through the processor 140 and the memory 120.

To this end, the processor 140 may include one or more processors. In this case, the one or more processors may be general-purpose processors, such as a CPU, an AP, a digital signal processor (DSP), graphics-only processors, such as a GPU, a vision processing unit (VPU), or AI-only processors, such as an NPU.

One or more processors control input data to be processed according to predefined operation rules or AI models stored in the memory 120. Alternatively, when one or more processors are processors dedicated to AI, the processors dedicated to AI may be designed with a hardware structure specialized for processing a specific AI model.

Predefined action rules or AI models are created through learning. Here, being created through learning means that a predefined operation rule or an AI model having desired characteristics is created by applying a learning algorithm to a plurality of learning data. Such learning may be performed in a device itself in which AI according to the disclosure is performed, or may be performed through a separate server/system.

Examples of learning algorithms include supervised learning, unsupervised learning, semi-supervised learning, or reinforcement learning, but are not limited to the above examples.

An AI model may include a plurality of neural network layers. Each of the plurality of neural network layers has a plurality of weight values, and a neural network operation is performed through an operation result of a previous layer and an operation of a plurality of weight values. A plurality of weight values possessed by a plurality of neural network layers may be optimized by a learning result of an AI model. For example, a plurality of weight values may be updated so that a loss value or a cost value obtained from an AI model is reduced or minimized during a learning process.

The artificial neural network may include a deep neural network (DNN), for example, a convolutional neural network (CNN), a deep neural network (DNN), a recurrent neural network (RNN), a restricted Boltzmann machine (RBM), a deep belief network (DBN), a bidirectional recurrent deep neural networks (BRDNN), deep Q-networks, and the like, and the neural networks in the disclosure are not limited to the above examples except for the cases specified.

The driving unit 130 is a component for controlling the body 101 and the wheels 102-1 and 102-2 of the robot 100, and may include a motor providing power to the wheels 102-1 and 102-2 of the robot 100. In addition, the driving unit 130 may include various components for controlling a movement of the internal components of the robot 100 described above with reference to FIGS. 9A to 9B.

The processor 140 may include the object tracking module 141, emotion analysis module 142, the motion determination module 143, the motion control module 144, the communication control module 145, the pet motion analysis module 146, etc. described above.

The communication unit 150 is a component for the robot 100 to communicate with at least one external device to exchange signals/data. To this end, the communication unit 150 may include a circuit.

The communication unit 150 may include at least one of a WIFI communication module, a Bluetooth module, an infrared data association (IrDA) module, a 3G (3rd generation) mobile communication module, a 4G (4th generation) mobile communication module, 4th generation long term evolution (LTE) communication module, and 5G (5th generation) mobile communication module to transmit and receive content or control signals to and from an external server or external device, but may use various types of known communication modules.

The sensor unit 160 is a component for detecting various information for driving of the robot 100.

For example, the sensor unit 160 may include a lidar sensor 161, an ultrasonic sensor 162, an acceleration sensor 163, and the like.

The robot 100 may identify surrounding structure/structures using the lidar sensor 161, the ultrasonic sensor 162, and the like, and may travel through the driving unit 130 not to collide with the identified surrounding structure/structures.

The robot 100 may identify a speed and current position of the robot 100 through the acceleration sensor 163.

The microphone 170 is a component for receiving a user's voice and a pet's voice. The microphone 170 includes at least one circuit for converting an input sound into an electrical audio signal.

The audio output unit 180 is a component for outputting voice or sound and may include a speaker. For example, the robot 100 may output a voice describing an emotional state of the pet or a non-verbal sound for expressing an emotional state of the pet through a speaker.

The light emitting unit or light emitter 190 is a component for outputting light of a color matched to the emotional state of the pet, and may include a light emitting diode (LED) device, but is not limited thereto.

The user input unit 195 is a component for receiving a user's command in various manners.

The user input unit 195 may be implemented as at least one button or a touch sensor. In addition, the camera 110 and the microphone 170 described above may also be understood as concepts included in the user input unit 195.

A control method of a robot according to the disclosure will be described through the following drawings.

Figure 16:
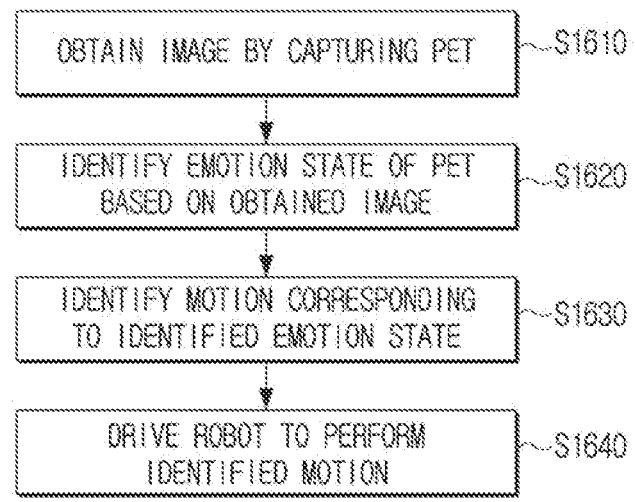
FIG. 16 is a flowchart illustrating a method for controlling a robot according to an embodiment of the disclosure.

FIG. 16 is a flowchart illustrating a method for controlling a robot according to an embodiment of the disclosure.

Referring to FIG. 16, in the control method, at least one image may be obtained by capturing a pet through a camera (S1610). In this case, the robot may track and monitor the pet in real time to continuously capture images including the pet.

Then, based on the obtained image, an emotional state of the pet may be identified (S1620).

At this time, the emotional state of the pet may be determined by inputting the image to at least one AI model.

Alternatively, the obtained image may be transmitted to a server through a communication unit. Specifically, when a motion of the pet identified based on the obtained image corresponds to a predetermined motion, the obtained image may be transmitted to the server.

Thereafter, when information on the emotional state identified based on the corresponding image is received from the server, the emotional state may be identified using the received information.

In the control method, a plurality of emotional states of the pet may be obtained as a result of determining the emotional state in real time.

In this case, at least one emotional state to be provided as a motion, among the plurality of emotional states, may be identified.

For example, when a user's voice for inquiring about a state of a pet is input through a microphone, an emotional state determined based on at least one image captured through a camera within a predetermined time range based on a time point at which the user's voice is input may be identified as an emotional state to be provided as a motion.

Alternatively, when a predetermined user's gesture is input through a touch sensor, an emotional state determined based on at least one image captured by the camera within a predetermined time range based on a time point at which the predetermined user's gesture is input may be identified as an emotional state to be provided as a motion.

Alternatively, in the control method, user location information may be received from at least one external device through a communication unit.

At this time, if it is identified that the user, who has left a place where the pet is located, returns to the place after the predetermined period of time, based on the received location information of the user, an emotional state determined based on at least one image captured through the camera from a time point at which the user left the corresponding place to a time point at which the user returns may be identified as an emotional state to be provided as a motion.

In addition, in the control method, a motion of the robot corresponding to the identified emotional state may be identified (S1630).

Specifically, among a plurality of pre-stored motions, a predetermined motion to be matched to the identified emotional state may be identified.

When the robot includes a body and wheels respectively provided on the left and right of the body, a plurality of motions may be performed by controlling a movement of at least one of the body and the wheels described above.

Also, in the control method, the robot may be driven to perform the identified motion (S1640).

In the control method, while the robot performs a motion corresponding to the identified emotional state, a sound corresponding to the identified emotional state may be output through a speaker. Here, the sound corresponding to the identified emotional state may be a voice describing the identified emotional state or a non-verbal sound expressing the identified emotional state.

Also, in the control method, while the robot performs a motion corresponding to the identified emotional state, light of a color corresponding to the identified emotional state may be output through the light emitting unit or light emitter.

In the control method, whether the emotional state of the pet has changed may be determined based on a plurality of images obtained by sequentially capturing the pet through a camera.

Here, when it is determined that the emotional state has changed, at least one image captured within a predetermined time range based on a time point at which the emotional state is changed may be identified, among a plurality of images sequentially captured.

In addition, a clip video corresponding to the changed emotional state may be generated based on the identified image.

Here, in the control method, the generated clip video may be transmitted to at least one display device through a communication unit.

Also, while the clip video is displayed on the display device, the robot may be driven to perform a motion corresponding to the changed emotional state.

Figure 17:
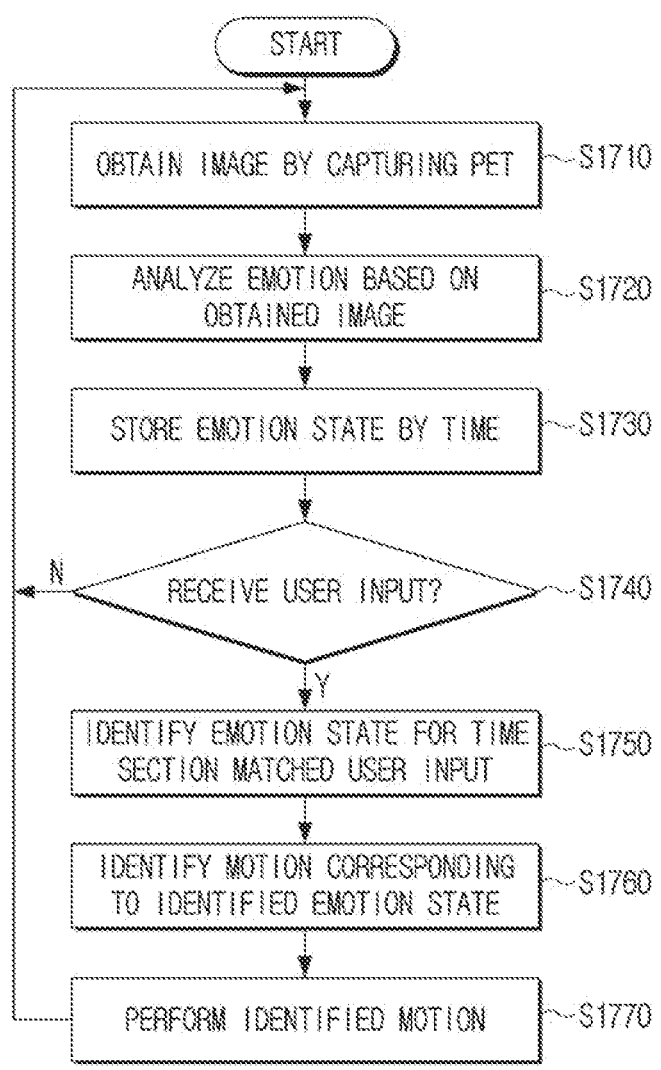
FIG. 17 is an algorithm for explaining a method for controlling a robot according to an embodiment of the disclosure.

FIG. 17 is an algorithm for explaining a method of controlling a robot according to an embodiment of the disclosure.

Referring to FIG. 17, in the control method, images may be sequentially obtained by capturing a pet (S1710), based on which the emotional state of the pet may be analyzed in real time (S1720). At this time, the emotional state analyzed in real time may be stored in the memory for each time (S1730).

Also, if a user input is received (S1740-Y), in the control method, an emotional state for a time interval matched to the user input may be identified (S1750).

For example, when a user's voice corresponding to a predetermined touch input or predetermined text is received, an emotional state of the pet during a time interval from a time point at which a touch input or user's voice is received before a predetermined time may be identified.

In addition, in the control method, a motion matched to the emotional state of the pet identified in step S1750 may be identified (S1760).

Then, the identified motion may be performed (S1770).

The control method described above with reference to FIGS. 16 to 17 may be performed by the robot 100 illustrated and described with reference to FIGS. 2A, 2B, and 15.

Alternatively, the control method described above with reference to FIGS. 16 to 17 may be performed through a system including the robot 100 and at least one external device (e.g., server, etc.).

Various example embodiments described above may be embodied in a recording medium that may be read by a computer or a similar apparatus to the computer by using software, hardware, or a combination thereof.

According to a hardware embodiment, embodiments that are described in the disclosure may be embodied by using at least one selected from application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions.

In some cases, embodiments described herein may be implemented by the processor itself. According to a software implementation, embodiments, such as the procedures and functions described herein may be implemented with separate software modules. Each of the software modules may perform one or more of the functions and operations described herein.

Computer instructions for performing processing operations in the robot 100 according to various embodiments of the disclosure described above may be stored in a non-transitory computer-readable medium. When the computer instructions stored in such a non-transitory computer-readable medium are executed by a processor of a specific device, the processing operation in the robot 100 according to various embodiments described above is performed by the specific device.

The non-transitory computer-readable medium refers to a medium that stores data semi-permanently rather than storing data for a very short time, such as a register, a cache, a memory or etc., and is readable by an apparatus. Specific examples of the non-transitory computer-readable medium may include a CD, DVD, hard disk, Blu-ray disk, USB, memory card, ROM, and the like.

The foregoing embodiments and advantages are merely exemplary and are not to be construed as limiting the disclosure. The present teaching may be readily applied to other types of apparatuses. Also, the description of the embodiments is intended to be illustrative, and not to limit the scope of the claims, and many alternatives, modifications, and variations will be apparent to those skilled in the art.

What is claimed is:

1. A robot comprising:
a camera;
a driver configured to control a motion of the robot;
a microphone;
memory configured to store one or more instructions, and information on a plurality of motions of the robot and a plurality of emotional states of a pet corresponding to the plurality of motions of the robot; and
at least one processor connected to the driver, the camera, and the memory,
wherein the at least one processor is configured to execute the one or more instructions, which when executed by the at least one processor, cause the robot to:
obtain a plurality of images of the pet through the camera,
identify at least one of the plurality of images taken within a predetermined time range of a point in time corresponding to receipt of a user inquiry regarding a state of the pet by the robot, wherein the predetermined time range comprises a point in time preceding the point in time corresponding to the receipt of the user inquiry to a point in time following the point in time corresponding to the receipt of the user inquiry,
identify, based on the identified at least one image of the pet and the information stored in the memory, an emotional state of the pet from among the plurality of emotional states of the pet,
identify, based on the information stored in the memory, a motion of the robot corresponding to the identified emotional state, from among the plurality of motions, and
control the driver to cause the robot to perform the identified motion of the robot.

2. The robot of claim 1, further comprising a body and a plurality of wheels attached to the body, wherein the one or more instructions, when executed by the at least one processor, cause the robot to control a movement of at least one of the body and at least one wheel of the plurality of wheels through the driver to cause the robot to perform the identified motion.

3. The robot as claimed in claim 1, wherein the user inquiry comprises a verbal user inquiry received through the microphone.

4. The robot as claimed in claim 1, further comprising a touch sensor,
wherein the user inquiry comprises a user gesture received through the touch sensor.

5. The robot of claim 1, further comprising a communicator,
wherein the one or more instructions, when executed by the at least one processor, cause the robot to:
receive first user location information through the communicator,
based on the first user location information, identify a first point in time corresponding to a user departing from a location where the pet is located,
receive second user location information through the communicator,
based on the second user location information, identify a second point in time corresponding to the user returning to the location where the pet is located, wherein a period of time including the first point in time through the second point in time comprises a departure period,
obtain at least one image of the pet through the camera during the departure period,
based on the at least one image of the pet obtained during the departure period, identify a departure period emotional state of the pet from among the plurality of emotional states of the pet, and
control the driver to cause the robot to perform a motion of the robot from among the plurality of motions of the robot corresponding to the departure period emotional state.

6. The robot of claim 1, further comprising:
a speaker; and
a light emitter,
wherein the one or more instructions, when executed by the at least one processor, cause the robot to control the speaker to output a sound corresponding to the identified emotional state and to control the light emitter to output light of a color corresponding to the identified emotional state.

7. The robot of claim 1, wherein the one or more instructions, when executed by the at least one processor, cause the robot to:
obtain a plurality of sequential images of the pet through the camera during a time period,
for each respective sequential image of the plurality of sequential images, identify an emotional state of the pet from among the plurality of emotional states of the pet corresponding to the respective sequential image of the plurality of sequential images,
based on the identified respective emotional states of the pet corresponding to each respective sequential image of the plurality of sequential images, determine whether the pet had a change of emotional state during the time period,
based on determining that the pet had the change of emotional state during the time period, identify at least one image from among the plurality of sequential images corresponding to the change of emotional state of the pet and identify an emotional state of the pet from among the plurality of emotional states of the pet corresponding to the identified at least one image from among the plurality of sequential images, and
generate a video based on the identified at least one image from among the plurality of sequential images.

8. The robot of claim 7, further comprising a communicator, wherein the one or more instructions, when executed by the at least one processor, cause the robot to;
transmit the video to a display device through the communicator, and
control the driver to cause the robot to perform a motion of the robot from among the plurality of motions of the robot corresponding to the identified emotional state of the pet from among the plurality of emotional states of the pet corresponding to the identified at least one image from among the plurality of sequential images.

9. The robot of claim 1, further comprising a communicator,
wherein the one or more instructions, when executed by the at least one processor, cause the robot to:
transmit the identified at least one image to a server through the communicator, and
based on the identified at least one image, receive information on an emotional state of the pet through the communicator from the server.

10. The robot of claim 9, wherein the one or more instructions, when executed by the at least one processor, cause the robot to:
identify a motion of the pet based on the identified at least one image, and based on the identified motion of the pet corresponding to a predetermined motion, transmit the at least one obtained image to the server.

11. A method for controlling a robot, the method comprising:
obtaining a plurality of images of a pet through a camera of the robot;
receiving a user input regarding a state of the pet;
identifying at least one of the plurality of images taken within a predetermined time range of a point in time corresponding to receipt of a user inquiry regarding a state of the pet by the robot, wherein the predetermined time range comprises a point in time preceding the point in time corresponding to the receipt of the user inquiry to a point in time following the point in time corresponding to the receipt of the user inquiry,
identifying an emotional state of the pet based on the obtained at least one image;
identifying a motion corresponding to the identified emotional state, from among a plurality of pre-stored motions; and
driving the robot to perform the identified motion from among the plurality of pre-stored motions.

12. The method of claim 11,
wherein the robot comprises a body and a plurality of wheels attached to the body, and
wherein the driving the robot comprises controlling a movement of at least one of the body and at least one wheel of the plurality of wheels to perform the identified motion.

13. The method of claim 11, wherein the robot further comprises a microphone, and the user input comprises an audio input received through the microphone.

14. The method of claim 11, wherein the robot further comprises a touch sensor, and the user input comprises a predetermined user gesture received through the touch sensor.

15. The method of claim 11, further comprising:
receiving first user location information;
based on the first user location information, identifying a first point in time corresponding to a user departing from a location where the pet is located;
receiving second user location information;
based on the second user location information, identifying a second point in time corresponding to the user returning to the location where the pet is located, wherein a period of time including the first point in time through the second point in time comprises a departure period; and
obtaining at least one image of the pet through the camera during the departure period,
wherein the identifying the emotional state of the pet further comprises identifying the emotional state of the pet based on the at least one image of the pet obtained during the departure period.

16. A robot comprising:
a camera;
a driver configured to control a motion of the robot;
memory configured to store one or more instructions, and information on a plurality of motions of the robot and a plurality of emotional states of a pet corresponding to the plurality of motions of the robot; and
at least one processor connected to the driver, the camera, and the memory,
wherein the at least one processor is configured to execute the one or more instructions, which when executed by the at least one processor, cause the robot to:
receive a user input regarding a state of the pet,
obtain a plurality of images of the pet through the camera;
identify at least one of the plurality of images taken within a predetermined time range of a point in time corresponding to receipt of the user input, wherein the predetermined time range comprises a point in time preceding the point in time corresponding to the receipt of the user input to a point in time following the point in time corresponding to the receipt of the user input,
identify, based on the identified at least one image of the pet and the information stored in the memory, an emotional state of the pet from among the plurality of emotional states of the pet,
control the driver to cause the robot to perform a motion of the robot corresponding to the identified emotional state from among the plurality of motions of the robot.

17. The robot of claim 16, further comprising a microphone, wherein the user input comprises an audio input received through the microphone.

18. The robot of claim 16, further comprising a touch sensor, wherein the user input comprises a predetermined user gesture received through the touch sensor.

* * * * *